United States Patent
Bussell

(10) Patent No.: US 10,406,509 B2
(45) Date of Patent: Sep. 10, 2019

(54) NANOSCALE NICKEL PHOSPHIDE CATALYSTS FOR HYDROTREATMENT

(71) Applicant: Western Washington University, Bellingham, WA (US)

(72) Inventor: Mark E. Bussell, Bellingham, WA (US)

(73) Assignee: Western Washington University, Bellingham, WA (US)

( * ) Notice: Subject to any disclaimer, the term of this patent is extended or adjusted under 35 U.S.C. 154(b) by 158 days.

(21) Appl. No.: 15/306,468

(22) PCT Filed: Apr. 22, 2016

(86) PCT No.: PCT/US2016/029009
§ 371 (c)(1),
(2) Date: Oct. 24, 2016

(87) PCT Pub. No.: WO2016/172603
PCT Pub. Date: Oct. 27, 2016

(65) Prior Publication Data
US 2017/0189893 A1 Jul. 6, 2017

Related U.S. Application Data

(60) Provisional application No. 62/151,890, filed on Apr. 23, 2015.

(51) Int. Cl.
*B01J 21/02* (2006.01)
*B01J 21/04* (2006.01)
(Continued)

(52) U.S. Cl.
CPC ......... *B01J 27/1853* (2013.01); *B01J 35/002* (2013.01); *B01J 35/006* (2013.01);
(Continued)

(58) Field of Classification Search
CPC ... B01J 21/02; B01J 21/04; B01J 21/08; B01J 21/12; B01J 27/1853; B01J 27/16;
(Continued)

(56) References Cited

U.S. PATENT DOCUMENTS 7,446,075 B1 * 11/2008 Kolev .................. B01J 27/1853
208/208 R
2014/0150332 A1 * 6/2014 Lee ........................ B01J 21/063
44/307
(Continued)

FOREIGN PATENT DOCUMENTS

CN  101734633 A  6/2010
CN  105214697 A * 1/2016 ............ B01J 27/185
(Continued)

OTHER PUBLICATIONS

Qingzin Guan et al., "A feasible approach to the synthesis of nickel phosphide for hydrodesulfurization." Journal of Catalysis 299, pp. 1-9 (availiable online Dec. 28, 2012). (Year: 2013).*
(Continued)

*Primary Examiner* — Patricia L. Hailey
(74) *Attorney, Agent, or Firm* — Christensen O'Connor Johnson Kindness PLLC

(57) ABSTRACT

This present disclosure is directed to methods for the preparation of a hydrotreatment catalyst, such as nanoscale nickel phosphide (i.e., $Ni_2P$) particles supported on high-surface area metal oxides (e.g., silica, alumina, amorphous silica-alumina), in a manner that is compatible with conditions employed in commercial hydrotreating units. The catalyst synthesis includes impregnation, drying, and in situ reduction, and can provide highly active catalysts for the removal of S and N impurities from crude oil fractions.

7 Claims, 17 Drawing Sheets

(51) Int. Cl.

| | | |
|---|---|---|
| *B01J 21/08* | (2006.01) | |
| *B01J 27/16* | (2006.01) | |
| *B01J 27/185* | (2006.01) | |
| *C01B 25/08* | (2006.01) | |
| *B01J 37/02* | (2006.01) | |
| *B01J 37/18* | (2006.01) | |
| *C10G 45/00* | (2006.01) | |
| *C10G 45/06* | (2006.01) | |
| *B01J 37/08* | (2006.01) | |
| *B01J 37/20* | (2006.01) | |
| *B01J 35/00* | (2006.01) | |
| *B01J 35/10* | (2006.01) | |

(52) U.S. Cl.
CPC ....... *B01J 35/0013* (2013.01); *B01J 35/1014* (2013.01); *B01J 35/1019* (2013.01); *B01J 37/0201* (2013.01); *B01J 37/0236* (2013.01); *B01J 37/08* (2013.01); *B01J 37/18* (2013.01); *B01J 37/20* (2013.01); *C01B 25/08* (2013.01); *C10G 45/00* (2013.01); *C10G 45/06* (2013.01); *C10G 2300/202* (2013.01)

(58) Field of Classification Search
CPC .... B01J 37/0201; B01J 37/0236; B01J 37/18; B01J 37/20
USPC ........................................................ 502/208
See application file for complete search history.

(56) References Cited

U.S. PATENT DOCUMENTS

2014/0155670 A1* 6/2014 Slowing ................... C07C 1/22
                                                           585/733
2016/0008795 A1* 1/2016 Ginestra ................ B01J 37/088
                                                           208/264

FOREIGN PATENT DOCUMENTS

| CN | 106582741 A | * 4/2017 | .............. B01J 27/19 |
|---|---|---|---|
| JP | 08-337881 | * 12/1996 | ................ C02F 1/58 |

OTHER PUBLICATIONS

Dapeng Liu et al., "Ni2P/Al2O3 hydrodesulfurization catalysts prepared by separating nickel compound and hypophosphite." Catalysis Today 292, pp. 133-142 (available online Sep. 19, 2016). (Year: 2017).*

Guan, Q. et al., "Alternative synthesis of bulk and supported nickel phosphide from the thermal decomposition of hypophosphites", Journal of Catalysis, vol. 263, No. 1, Apr. 1, 2009, pp. 1-3.

Shi, G. et al., "Mesoporous carbon supported nickel phosphide catalysts prepared by solid phase reaction", Catalysis Communications, vol. 10, No. 13, Jul. 25, 2009, pp. 1693-1696.

Extended European Search Report dated Nov. 23, 2017 in counterpart European Patent Application No. 16781654.5, filed Apr. 22, 2016, 10 pages.

R. Bowker et al., Synthesis and Hydrodeoxygenation Properties of Ruthenium Phosphide Catalysts, Letter, Jul. 6, 2011 (web), pp. 917-922, vol. 1, ACS Catalysis, American Chemical Society.

J.A. Cecilia et al., A Novel Method for Preparing an Active Nickel Phosphide Catalyst for HDS of dibenzothiophene, Journal, 2009, pp. 4-15, vol. 263, Journal of Catalysis.

I. d'Aquino et al., Highly-Active Nickel Phosphide Hydrotreating Catalysts Prepared in Situ Using Nickel Hypophosphite Precursors, Journal, Mar. 2016, vol. 335, 2 pages, Journal of Catalysis.

International Search Report and Written Opinion, dated Jul. 26, 2016 in corresponding International Application No. PCT/US2016/029009 filed Apr. 22, 2016, 9 pages.

International Preliminary Report on Patentability, dated Oct. 24, 2017, for International Application No. PCT/US2016/029009, filed Apr. 22, 2016, 6 pages.

* cited by examiner

High Pressure Reactor Studies
- HDN
    - Reactor Feed: 1000 ppm Carbazole + 3000 ppm benzothiophene in decane/xylene + $H_2$, 267-407°C, 3.0 MPa (29.6 atm)
- HDS
    - Reactor Feed: 1000 ppm 4,6 – dimethyl dibenzothiophene in decalin + $H_2$, 257-327°C, 3.0 MPa (29.6 atm)

| Catalyst | P/Ni | Ave. Particle Size (nm) | Surface Area (m²/g) | CO Chem. (µmol/g) |
|---|---|---|---|---|
| Ni$_2$P/SiO$_2$-phos | 0.9 | 15 | 132 | 113 |
| Ni$_2$P/SiO$_2$-hypo | 1.5 | 3.2 ± 0.4 | 199 | 43 |

| Catalyst | Ave. Particle Size (nm) | Surface Area (m²/g) | CO Chem. (μmol/g) |
|---|---|---|---|
| Ni₂P/Al₂O₃-phos | 19 | 97 | 52 |
| Ni₂P/Al₂O₃-hypo | 3.9 ± 0.6 | 159 | 57 |

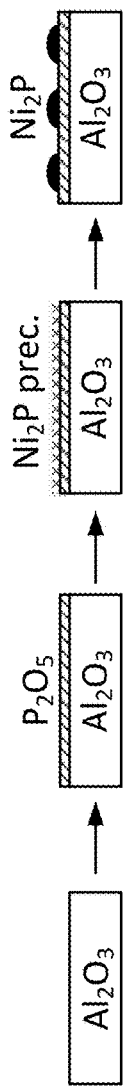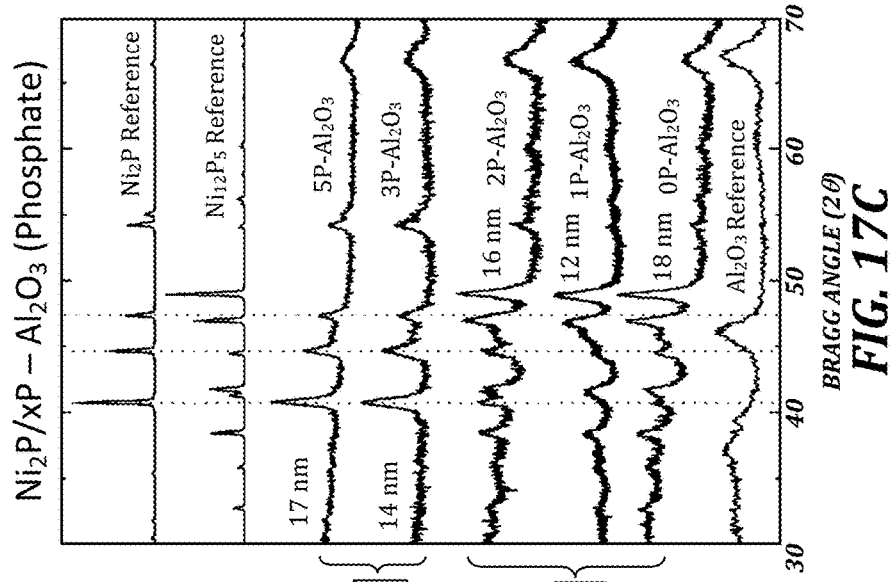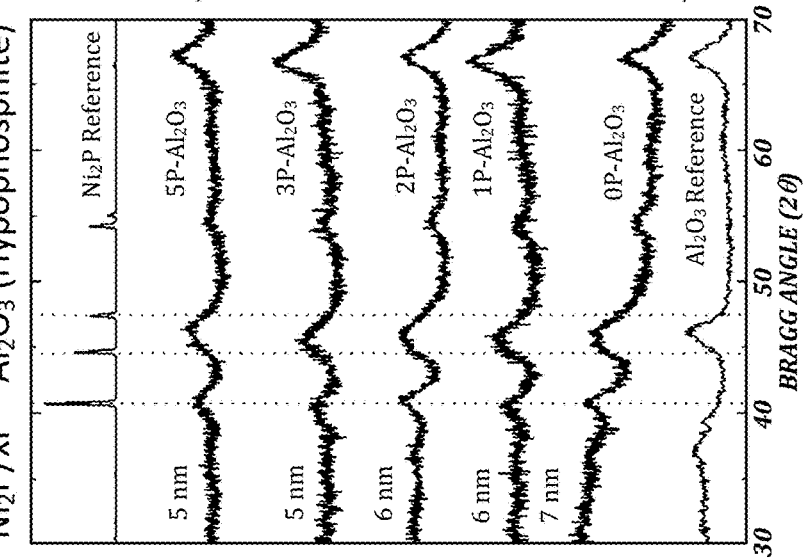
FIG. 17A
FIG. 17B
FIG. 17C

NANOSCALE NICKEL PHOSPHIDE CATALYSTS FOR HYDROTREATMENT

CROSS-REFERENCE TO RELATED APPLICATION

This application claims the benefit of U.S. Patent Application No. 62/151,890, filed Apr. 23, 2015, the disclosure of which is hereby incorporated by reference in its entirety.

BACKGROUND

The removal of sulfur and nitrogen impurities from fossil fuel feedstocks is a critical processing step in producing ultralow sulfur transportation fuels. The removal of organonitrogen compounds is necessary to achieve the ultralow sulfur levels since these compounds inhibit sulfur removal. In addition, organosulfur and organonitrogen compounds poison catalysts used in down-stream refinery processes such as hydrocracking, catalytic cracking and reforming. While sulfided Co—Mo/$Al_2O_3$ and Ni—Mo/$Al_2O_3$ hydrotreatment catalysts are the workhorses of commercial hydrotreating processes, a considerable research effort is ongoing to assess the potential of alternate catalytic materials for hydrotreatment, such as metal phosphides for the hydrodenitrogenation (HDN) and hydrodesulfurization (HDS) reactions. A number of laboratories have investigated the HDS properties of the monometallic phosphides of the first-row transition metals (e.g., $Ni_2P$), of MoP (molybdenum phosphide), and WP (tungsten phosphide) on supports such as silica, as well as the HDS properties of bimetallic phosphide materials. Among the monometallic phosphides, $Ni_2P$ has generally been identified as being the most active hydrotreatment catalyst for HDS of thiophene, dibenzothiophene (DBT) and 4,6-dimethyldibenzothiophene (4,6-DMDBT). Some bimetallic phosphide catalysts, $Ni_2P$ containing a second first-row metal (e.g., $Fe_{0.03}Ni_{1.97}P/SiO_2$), for example, have exhibited HDS activities that are higher than those of the binary phosphides of the same metals, as well as different product selectivities.

There is a need for $Ni_2P$ hydrotreatment catalysts having superior HDS and HDN activities, as well as having improved selectivity for certain hydrotreatment products compared to existing hydrotreatment catalysts. For example, $Ni_2P$ hydrotreatment catalysts having higher HDS and HDN activities relative to conventional Co—Mo/$Al_2O_3$ and Ni—Mo/$Al_2O_3$ sulfide catalysts are desirable. There is also a need for $Ni_2P$ hydrotreatment catalysts that can be readily and easily synthesized at low temperatures (T≤400° C.). The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a method of preparing a hydrotreatment catalyst including nanoscale $Ni_2P$ particles on a support. The method includes the steps of (a) providing an impregnation solution comprising nickel hydroxide in hypophosphorous acid;

(b) impregnating the support with the impregnation solution;

(c) drying the impregnation solution to provide $Ni(H_2PO_2)_2$ on the support; and (d) reducing the $Ni(H_2PO_2)_2$ on the support in a hydrogen environment, a sulfiding environment or an inert gas environment and at a temperature of 300-500° C. to provide a hydrotreatment catalyst comprising nanoscale $Ni_2P$ particles on the support.

In another aspect, the present disclosure features a method of hydrotreating a petroleum feedstock. The method includes hydrotreating the petroleum feedstock in a reactor using a hydrotreatment catalyst prepared according to the methods described herein.

In yet another aspect, the present disclosure features a hydrotreatment catalyst including nanoscale $Ni_2P$ particles on a support, prepared according to the methods described herein.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings.

FIG. 17A is a schematic representation of an embodiment of the preparation steps for phosphorus (P–) (or boron (B–)) modified $Ni_2P/Al_2O_3$ catalysts.

FIG. 17B shows X-ray diffraction patterns for hypophosphite-based $Ni_2P/P$—$Al_2O_3$ catalysts having different P-loadings on an $Al_2O_3$ support (0-5 wt % P).

FIG. 17C shows X-ray diffraction patterns for phosphate-based $Ni_2P/P$—$Al_2O_3$ catalysts having different P-loadings on an $Al_2O_3$ support (0-5 wt % P).

DETAILED DESCRIPTION

This present disclosure is directed to methods for the preparation of a hydrotreatment catalyst, such as nanoscale nickel phosphide (i.e., $Ni_2P$) particles supported on high-surface area metal oxides (e.g., silica, alumina, amorphous silica-alumina, titania, zirconia), in a manner that is compatible with conditions employed in commercial hydrotreating units. The catalyst synthesis includes impregnation, drying, and in situ reduction, and can provide highly active catalysts for the removal of S and N impurities from crude oil fractions.

Figure 1:
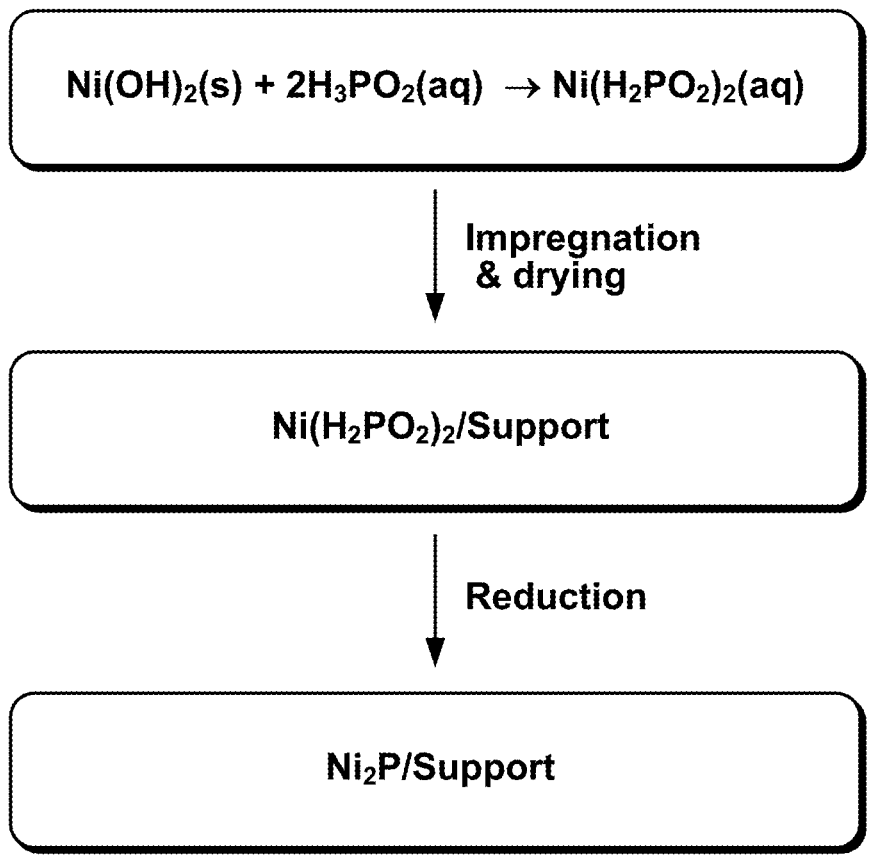
FIG. 1 is a schematic representation of a synthesis of an embodiment of a metal oxide-supported $Ni_2P$ catalyst of the present disclosure.

Referring to FIG. 1, the preparation of nanoscale $Ni_2P$ (nickel phosphide) particles on a support includes an impregnation step, a drying step, and a reduction step. The impregnation step includes dissolving a metal hydroxide, such as nickel hydroxide ($Ni(OH)_2$), in hypophosphorous acid ($H_3PO_2$) to provide a $Ni(H_2PO_2)_2$ impregnation solution. In some embodiments, the hypophosphorous acid is an aqueous solution, such as a 50 wt % aqueous solution (e.g., 25-75 wt % $H_3PO_2(aq)$). The concentration of the hypophosphorous acid solution is determined by the stoichiometry of the reaction between nickel hydroxide and hypophosphorous acid. In some embodiments, the concentration of $Ni(H_2PO_2)_2$ impregnation solution can be adjusted by diluting with or removal of water.

In some embodiments, the $Ni(H_2PO_2)_2$ impregnation solution has a phosphorus-to-nickel mole ratio (P/Ni) of 2.0, of 1.0 to 2.0, or greater than 2. In some embodiments, the $Ni(H_2PO_2)_2$ impregnation solution has a phosphorus-to-nickel mole ratio of 1.0 to 2.0. The phosphorus-to-nickel ratio can be adjusted to lower or higher values by adding a metal salt (e.g., $Ni(NO_3)_2$, $NiCl_2$, $NiSO_4$, $NiCO_3$) or more $H_3PO_2$, respectively. The $Ni(H_2PO_2)_2$ impregnation solution can be maintained at a temperature of 20° C. or more (e.g., 40° C. or more, 50° C. or more, 60° C. or more, or 70° C. or more) and/or 75° C. or less (e.g., 70° C. or less, 60° C. or less, 50° C. or less, or 40° C. or less), to decrease the likelihood or prevent the precipitation of dissolved materials. In some embodiments, the $Ni(H_2PO_2)_2$ impregnation solution is maintained at a temperature of 70° C. or less.

The $Ni(H_2PO_2)_2$ impregnation solution can be applied (e.g., impregnated) onto a high surface area metal oxide support, and the $Ni(H_2PO_2)_2$ solution impregnated support can be dried to provide $Ni(H_2PO_2)_2$ impregnated on the support using either the incipient wetness or equilibrium adsorption method. In some embodiments, drying the $Ni(H_2PO_2)_2$ solution-impregnated support can include heating the impregnated support, for example, to a temperature of 70° C. (e.g., 60° C., 50° C., or 40° C.). For example, heating the impregnated support can be to a temperature of 40° C. or more (e.g., 50° C. or more, 60° C. or more) and/or 70° C. or less (e.g., 60° C. or less, 50° C. or less). The dried $Ni(H_2PO_2)_2$-impregnated support (i.e., the catalyst precursor) can have 20 wt % or less of water.

In some embodiments, the dried $Ni(H_2PO_2)_2$-impregnated support is then heated and reduced in a reducing atmosphere to provide nanoscale $Ni_2P$ particles on the support. During the heating and reduction step, the nickel hypophosphite on the support is converted to nanoscale $Ni_2P$ particles. The nanoscale $Ni_2P$ particles can be relatively phase pure. As used herein, a "phase pure" nanoscale $Ni_2P$ particle denotes that the only phase identified by X-ray diffraction or transmission electron microscopy is $Ni_2P$. The heating and reduction can include loading the dried $Ni(H_2PO_2)_2$-impregnated support into a reactor system, purging the reactor system at room temperature using an inert gas (e.g., nitrogen or argon), and then heating the dried $Ni(H_2PO_2)_2$ impregnated support in flowing hydrogen ($H_2$) gas, or a sulfiding gas, to an elevated temperature. The sulfiding gas can include a sulfiding agent, such as a flowing gaseous mixture of hydrogen sulfide in hydrogen (e.g., 3-10 mol % $H_2S/H_2$).

In some embodiments, during the heating and reducing step, the hydrogen gas or sulfiding gas is flowed at a rate of 50 mL/min or more (e.g., 60 mL/min or more, or 70 mL/min or more) and/or 80 mL/min or less (e.g., 70 mL/min or less, or 60 mL/min or less). In some embodiments, the gas is flowed at a rate of 50 mL/min, 60 mL/min, 70 mL/min, or 80 mL/min. In some embodiments, the gas is flowed at a rate of 60 mL/min.

In some embodiments, during the heating and reducing step, the elevated temperature for the reduction reaction is 300° C. or more (e.g., 350° C. or more, 400° C. or more, or 450° C. or more) and/or 500° C. or less (e.g., 450° C. or less, 400° C. or less, or 350° C. or less). For example, the elevated temperature for the reduction is 300° C. to 500° C. (e.g., 300° C. to 450° C., 300° C. to 400° C., 350° C. to 500° C., 350° C. to 450° C., or 400° C. to 500° C.). In some embodiments, the dried $Ni(H_2PO_2)_2$-impregnated support is heated and reduced for a duration of about 30 minutes or more (e.g., 1 hour or more, 2 hours or more, 3 hours or more) and/or 4 hours or less (e.g., 3 hours or less, 2 hours or less, or 1 hour or less). For example, the dried $Ni(H_2PO_2)_2$ impregnated support can be heated and reduced for 1 hour, 2 hours, 3 hours, or 4 hours. In certain embodiments, the dried $Ni(H_2PO_2)_2$-impregnated support is heated and reduced for 2 hours.

The synthetic procedure of the present disclosure presents numerous advantages. For example, the nanoscale $Ni_2P$ particles produced using the synthetic procedure of the present disclosure do not need to be washed with water, since the synthesis does not produce salts that must be removed. For example, when a hydrogen atmosphere is used for the reduction step, the reaction proceeds as follows:

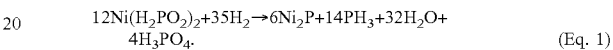

$$12Ni(H_2PO_2)_2 + 35H_2 \rightarrow 6Ni_2P + 14PH_3 + 32H_2O + 4H_3PO_4. \quad \text{(Eq. 1)}$$

As can be seen from Equation 1, the reaction does not produce any salt by-products. The synthesis of the nanoscale $Ni_2P$ particles is relatively easy, and can be carried out directly in a hydrotreatment reactor (i.e., in situ preparation) at low temperatures (T≤400° C.) and without the need of a washing step to remove salt by-products, using a reducing agent (e.g., $H_2$ or $H_2S/H_2$).

The synthetic procedure of the present disclosure provides nanoscale $Ni_2P$ particles having desirable physical and catalytic properties, as will be detailed infra.

Support

The support for the nanoscale $Ni_2P$ particles can include a variety of metal oxides, such as alumina ($Al_2O_3$), silica ($SiO_2$), or amorphous silica-alumina (ASA). In some embodiments, the support can have Brunauer-Emmett-Teller (BET) surface areas of 25 $m^2/g$ or more (e.g., 50 $m^2/g$ or more, 100 $m^2/g$ or more, 200 $m^2/g$ or more, 300 $m^2/g$ or more, or 400 $m^2/g$ or more) and/or 500 $m^2/g$ or less (e.g., 400 $m^2/g$ or less, 300 $m^2/g$ or less, 200 $m^2/g$ or less, 100 $m^2/g$ or less, or 50 $m^2/g$ or less). In some embodiments, the support can have BET surface areas of 500 $m^2/g$ or more.

In some embodiments, the support can have pore volumes of 0.1 $cm^3/g$ or more (e.g., 0.3 $cm^3/g$ or more, or 0.7 $cm^3/g$ or more) and/or 1.0 $cm^3/g$ or less (e.g., 0.7 $cm^3/g$ or less, or 0.3 $cm^3/g$ or less). In some embodiments, the support can have average Barrett-Joyner-Halenda (BJH) pore sizes of 1 nm or more (e.g., 5 nm or more, 15 nm or more, 25 nm or more) and/or 30 nm or less (e.g., 25 nm or less, 15 nm or less, or 5 nm or less). In some embodiments, the support can have BJH pore sizes of 30 nm or more.

In some embodiments, the metal oxide support includes a surface layer of $P_2O_5$, $B_2O_3$, or both. The surface layer can have an average thickness of 0.1 nm or more (e.g., 0.5 nm or more, 1 nm or more, 2 nm or more, 3 nm or more, or 4 nm or more) and/or 5 nm or less (e.g., 4 nm or less, 3 nm or less, 2 nm or less, 1 nm or less, or 0.5 nm or less). In some embodiments, the surface layer of the support has an average thickness of 5 nm or less (e.g., 4 nm or less, 3 nm or less, 2 nm or less, or 1 nm or less). In some embodiments, the average thickness of the surface layer is measured using X-ray photoelectron spectroscopy. In some embodiments, the surface layer is continuous. In certain embodiments, the surface layer is non-continuous. Without wishing to be bound by theory, it is believed that the surface layer is associated to the bulk of the support via a combination of covalent and ionic bonds.

The surface layer of $P_2O_5$, $B_2O_3$, or both, on the metal oxide support can be deposited onto the support prior to impregnating the support with $Ni(H_2PO_2)_2$. For example, to prepare a $B_2O_3$ and/or $P_2O_5$ surface layer on the support (e.g., silica, alumina, or amorphous silica-alumina), selected amounts of boron and/or phosphorus-containing compounds such as $H_3BO_3$, $H_3PO_4$, and/or an ammonium phosphate salt such as $NH_4H_2PO_4$ and/or $(NH_4)_2HPO_4$, and water can be impregnated onto the support until incipient wetness is achieved. After impregnation using the boron and/or phosphorus compounds, the impregnated support can be dried, then calcined to provide a metal oxide support having a $P_2O_5$ and/or $B_2O_3$ surface layer.

Drying of the boron- or phosphorus-impregnated support can occur at 70° C. or more (e.g., 80° C. or more, 100° C. or more, or 110° C. or more) and/or 120° C. or less (e.g., 110° C. or less, 100° C. or less, 80° C. or less), for a duration of 24 hours or more (e.g., 36 hours or more, 48 hours or more, or 60 hours or more) and/or 72 hours or less (e.g., 60 hours or less, 48 hours or less, or 36 hours or less). Calcining the dried impregnated support can be conducted in an oxygen-containing atmosphere (e.g., air) or pure oxygen at a temperature of from 400° C. or more (e.g., 425° C. or more, or 450° C. or more) and/or 500° C. or less (e.g., 450° C. or less, or 425° C. or less), for a duration of 2 hours or more (e.g., 3 hours or more, or 4 hours or more) and/or 5 hours or less (e.g., 4 hours or less, or 3 hours or less).

The supports of the present disclosure can be characterized using X-ray diffraction, X-ray photoelectron spectroscopy, transmission electron microscopy, BET surface area, and BJH pore size measurements.

Catalyst Characteristics

In some embodiments, the nanoscale $Ni_2P$ particles on the support synthesized by the methods of the present disclosure have a relatively uniform diameter. As used herein, "uniform diameter" refers to a diameter that does not vary by more than 20% compared to an average diameter of the nanoscale $Ni_2P$ particles. In some embodiments, the nanoscale $Ni_2P$ particles are in the form of a plurality of $Ni_2P$ crystallites on a surface of the support, as identified and characterized using X-ray diffraction and transmission electron microscopy. The crystallites can have an average diameter of 3 nm or more (e.g., 5 nm or more, or 10 nm or more) and/or 15 nm or less (e.g., 10 nm or less, or 5 nm or less). In some embodiments, the crystallites have an average diameter of 3 nm to 15 nm. In certain embodiments, the crystallites have an average diameter of 3 nm to 5 nm. In some embodiments, the crystallites have an average diameter of 3 nm or less (e.g., 3 nm, 2 nm, or 1 nm).

Without wishing to be bound by theory, it is believed that smaller particles can result in increased dispersion of the active $Ni_2P$ phase and thereby provide a higher active catalytic site density. It is also believed that uniformly-sized particles can allow for better control of catalytic activity and product selectivity.

The nanoscale $Ni_2P$ particles can have a surface that is relative rich in phosphorus, compared to the bulk of the nanoscale $Ni_2P$ particles. The composition of the surface and bulk of the nanoscale $Ni_2P$ particles can be determined using X-ray photoelectron spectroscopy (which can provide a quantitative measure of surface composition) and energy dispersive X-ray spectroscopy (EDX) (which can provide a semi-quantitative measure of bulk composition), respectively. Without wishing to be bound by theory, it is believed that a surface enrichment in phosphorus can provide increased stability to the $Ni_2P$ catalyst (e.g., provide better resistance to sulfur poisoning or bulk sulfide formation) and provide desirable catalytic activity and selectivity properties.

In some embodiments, using X-ray photoelectron spectroscopy, the composition of the surface of a nanoscale $Ni_2P$ particle can be measured to a depth of 3 to 10 nm. In some embodiments, the surface composition of the nanoscale $Ni_2P$ particles includes a mole ratio of P/Ni of 1.0 or more (e.g., 2.0 or more, 3.0 or more, 4.0 or more, 5.0 or more) and/or 6.0 or less (e.g., 5.0 or less, 4.0 or less, 3.0 or less, or 2.0 or less), as determined by X-ray photoelectron spectroscopy. In some embodiments, the surface composition of the nanoscale $Ni_2P$ particles includes a mole ratio of P/Ni of 1.0 to 6.0 (e.g., 1.0 to 5.0, 2.0 to 6.0, 2.0 to 5.0, or 2.0 to 4.0), as determined by X-ray photoelectron spectroscopy.

In some embodiments, the nanoscale $Ni_2P$ particles have a bulk portion, below the surface layer, the bulk portion has a mole ratio of P/Ni that is less than that of the surface layer. For example, the bulk portion can have a mole ratio of P/Ni of 0.5 or more (e.g., 1.0 or more, 2.0 or more, 3.0 or more, 4.0 or more) and/or 5.0 or less (e.g., 4.0 or less, 3.0 or less, 2.0 or less, or 1.0 or less), provided that the bulk portion P/Ni mole ratio is less than the P/Ni mole ratio of the surface layer of the nanoscale $Ni_2P$ particles.

The nanoscale $Ni_2P$ particles can be 5 wt % or more (e.g., 8 wt % or more, 10 wt % or more, or 15 wt % or more) and/or 25 wt % or less (e.g., 15 wt % or less, 10 wt % or less, or 8 wt % or less) of the total weight of the hydrotreatment catalyst, which includes the nanoscale $Ni_2P$ particles and the support. In some embodiments, the nanoscale $Ni_2P$ particles are 5 wt % to 25 wt % (e.g., 5 wt % to 15 wt %, 5 wt % to 10 wt %, or 10 wt % to 25 wt %) of the total weight of the hydrotreatment catalyst. The $Ni_2P$ wt % is calculated based on the amount of Ni and P that is impregnated into the support.

In some embodiments, the hydrotreatment catalyst of the present disclosure has a BET surface area of 75 $m^2/g$ or more (e.g., 100 $m^2/g$ or more, 150 $m^2/g$ or more, or 200 $m^2/g$ or more) and/or 250 $m^2/g$ or less (e.g., 200 $m^2/g$ or less, 150 $m^2/g$ or less, or 100 $m^2/g$ or less). In certain embodiments, the hydrotreatment catalyst of the present disclosure has a BET surface area of 75 $m^2/g$ to 250 $m^2/g$ (e.g., 100 $m^2/g$ to 200 $m^2/g$ or 150 $m^2/g$ to 250 $m^2/g$). In some embodiments, the hydrotreatment catalyst of the present disclosure has a BET surface area of 250 $m^2/g$ or more. Without wishing to be bound by theory, it is believed that a higher BET surface area provides better catalytic properties.

Catalyst Evaluation—Hydrodenitrogenation

The catalytic activity of the hydrotreatment catalysts of the present disclosure can be evaluated using a hydrodenitrogenation test. As used herein, the hydrodenitrogenation test can include exposing the hydrotreatment catalyst to 1000 ppm carbazole and 3000 ppm benzothiophene in a 60 wt % decane and 39.55 wt % p-xylene solvent mixture at a rate of 5.4 mL/min, a $H_2$ flow rate of 50.0 mL/min, at a temperature of about 267 to 407° C., and at a pressure of 3.0 MPa.

In some embodiments, the hydrotreatment catalyst of the present disclosure, i.e., the nanoscale $Ni_2P$ particles on the support, have a carbazole hydrodenitrogenation turnover frequency of 0.0001/s or more (e.g., 0.0002/s or more, 0.0003/s or more, 0.0004/s or more, or 0.0005/s or more) and/or 0.0006/s or less (e.g., 0.0005/s or less, 0.0004/s or less, 0.0003/s or less, or 0.0002/s or less), at 350° C., over a time period of 24 hours to 120 hours, when subjected to a hydrodenitrogenation test. For example, the hydrotreatment catalyst can have a carbazole hydrodenitrogenation turnover frequency of 0.0001/s to 0.0006/s (e.g., 0.0001/s to 0.0005/s, 0.0002/s to 0.0006/s, or 0.0002/s to 0.0004/s) at 350° C., over a time period of 24 hours to 120 hours, when subjected to a hydrodenitrogenation test. Without wishing to be bound by theory, it is believed that a high turnover frequency is indicative of highly active catalytic sites. A superior catalyst can have a high turnover frequency and/or a high chemisorption capacity, which is a measure of active sites.

In some embodiments, when the nanoscale $Ni_2P$ particles are 5 wt % to 25 wt % (e.g., 5 wt % to 20 wt %, 10 wt % to 20 wt %, 10 wt % to 15 wt %, 15 wt % to 20 wt %) of the hydrotreatment catalyst (i.e., 5 wt % to 25 wt % of the total combined weight of the nanoscale $Ni_2P$ particles and the support), the hydrotreatment catalyst is capable of providing a carbazole hydrodenitrogenation conversion of 1% to 97% (e.g., 1% to 95%, 1% to 90%, 90% to 97%, 80% to 97%), at 350° C. over a time period of 24 hours to 120 hours, when subjected to the hydrodenitrogenation test.

In some embodiments, when subjected to carbazole and benzothiophene (for example, in a hydrodenitrogenation test), the hydrotreatment catalyst of the present disclosure provides higher proportions of a cyclohexylbenzene product, compared to a sulfided nickel-molybdenum catalyst on alumina. For example, the hydrotreatment catalyst can provide 20% to 50% more of a cyclohexylbenzene product, compared to a sulfided nickel-molybdenum catalyst on alumina having a composition of 4 wt % NiO, 19.5 wt % $MoO_3$, and 8 wt % $P_2O_5$ (in its oxidic form).

Catalyst Evaluation—Hydrodesulfurization

In some embodiments, the catalytic activity of the hydrotreatment catalysts of the present disclosure can be evaluated using a hydrodesulfurization test. As used herein, the hydrodesulfurization test includes exposing the hydrotreatment catalyst to 1000 ppm of 4,6-dimethyldibenzothiophene in decalin, a $H_2$ flow rate of 50.0 mL/min, at a temperature of about 257 to 327° C., and at a pressure of 3.0 MPa.

In some embodiments, when the nanoscale $Ni_2P$ particles are 5 wt % to 25 wt % (e.g., 5 wt % to 20 wt %, 10 wt % to 20 wt %, 10 wt % to 15 wt %, 15 wt % to 20 wt %) of the hydrotreatment catalyst (i.e., 5 wt % to 25 wt % of the total combined weight of the nanoscale $Ni_2P$ particles and the support), the hydrotreatment catalyst is capable of providing a 4,6-dimethyldibenzothiophene hydrodesulfurization conversion of 1% to 65% (e.g., 1% to 50%, 5% to 65%, 10% to 65%, or 50% to 65%), at 300° C., over a time period of 24 hours to 120 hours, when subjected to a hydrodesulfurization test.

In some embodiments, nanoscale $Ni_2P$ particles on an alumina support that has a $P_2O_5$ and/or $B_2O_3$ surface layer can have good 4,6-dimethyldibenzothiophene hydrodesulfurization conversion. In some embodiments, the alumina support can have a phosphorus content of from 1 wt % to 2 wt %. In certain embodiments, the alumina support can have a boron content of from 0.6 wt % to 1.2 wt %.

Hydrotreatment of Petroleum Feedstock

In some embodiments, the hydrotreatment catalyst of the present disclosure is used to hydrotreat a petroleum feedstock (e.g., a petroleum distillate). The hydrotreatment of petroleum feedstock can occur in a reactor using the hydrotreatment catalyst. The hydrotreatment can include one or more of hydrodenitrogenation (HDN), hydrodesulfurization (HDS), hydrodeoxygenation (HDO), hydrodemetallation (HDM), and hydrogenation (HYD).

In some embodiments, the hydrotreatment catalyst is prepared in situ in the reactor by reducing the $Ni(H_2PO_2)_2$ that is impregnated on the support in a reducing atmosphere in the reactor, to provide nanoscale $Ni_2P$ particles on the support, prior to hydrotreating the petroleum feedstock. The reduction of the $Ni(H_2PO_2)_2$ can include heating to a temperature below a temperature limit of the reactor, for example, heating to a temperature of 400° C. or less in the reactor. An in situ reduction of the hydrotreatment catalyst can be more convenient, cost-effective, and can provide greater amounts of active catalyst, when compared to a hydrotreatment catalyst prepared via an ex situ reduction.

In some embodiments, the hydrotreatment catalyst is prepared ex situ (i.e., in a separate reactor different from the hydrotreatment reactor), and then placed in the reactor prior to hydrotreating the petroleum feedstock. An ex situ preparation of the hydrotreatment can allow for the identification of an active catalytic phase, and can allow for quantification of the number of active sites and other properties.

As discussed above, the synthesis of the nanoscale $Ni_2P$ particles does not require a step of washing the hydrotreatment catalyst prior to hydrotreating the petroleum feedstock, since the synthesis does not produce salts that must be removed.

The following example is included for the purpose of illustrating, not limiting, the described embodiments. Example 1 describes a method for preparing nanoscale $Ni_2P$ particles on supports and characterization of the resulting materials. Example 2 describes the synthesis and characterization of nanoscale $Ni_2P$ particles on $P_2O_5$- or $B_2O_3$-modified supports.

EXAMPLES

Example 1

Synthesis and Characterization of $Ni_2P$ Supported on Silica, Alumina, or ASA

This example describes a method for synthesizing metal phosphide catalysts (e.g., $Ni_2P$) supported on high surface area metal oxides (e.g., silica, alumina, amorphous silica-alumina) in a manner that is compatible with conditions employed in commercial hydrotreating units. The catalyst synthesis includes impregnation, drying and in situ reduction (i.e., reduction within the hydrotreatment reactor) and yields highly active catalysts for the removal of S and N impurities from crude oil fractions.

Catalyst Preparation

A metal hydroxide, such as nickel hydroxide ($Ni(OH)_2$), was dissolved in hypophosphorous acid ($H_3PO_2$, 50 wt % aqueous solution). The resulting solution had a phosphorus-to-nickel mole ratio (P/Ni) of 2.0, the solution was maintained at an elevated temperature (≤70° C.) to avoid precipitation of solid material. The solution was impregnated onto a high surface area metal oxide support and dried at 70° C. The dried catalyst precursor was loaded into the reactor system, purged at room temperature in an inert gas, and then heated in flowing hydrogen ($H_2$) or hydrogen sulfide/hydrogen to a temperature in the range 300-500° C. During the heating step, the nickel hypophosphite on the oxide support was converted to phase-pure $Ni_2P$.

Catalyst Characterization

Figure 3B:
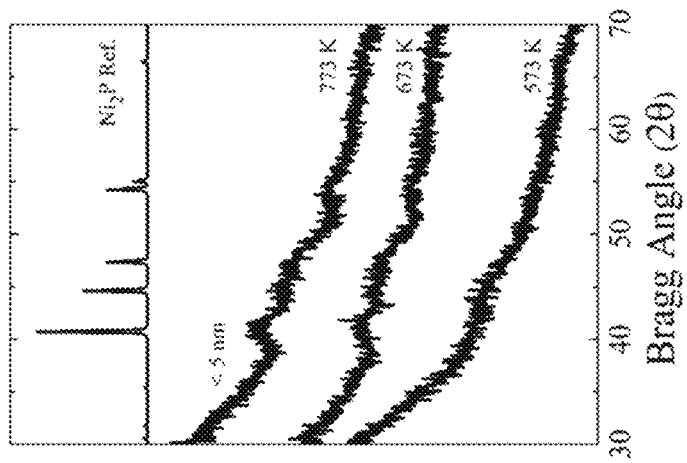
FIG. 3B shows X-ray diffraction patterns for embodiments of 25 wt % $Ni_2P$/amorphous silica-alumina (ASA) catalysts prepared from hypophosphite-based precursors.
Figure 3A:
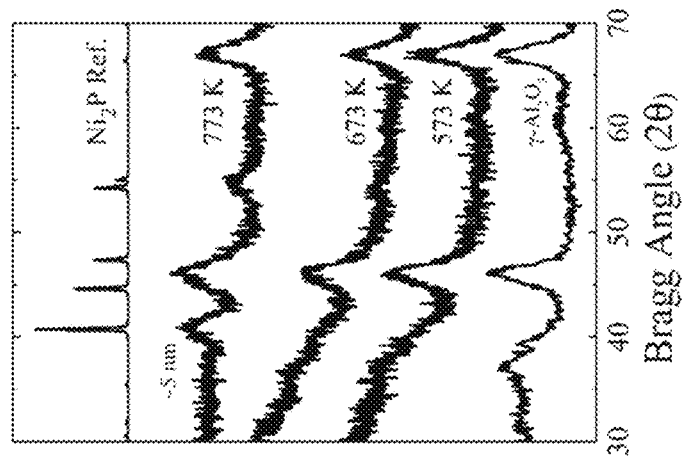
FIG. 3A shows X-ray diffraction patterns for embodiments of 25 wt % $Ni_2P/Al_2O_3$ catalysts prepared from hypophosphite-based precursors.
Figure 2:
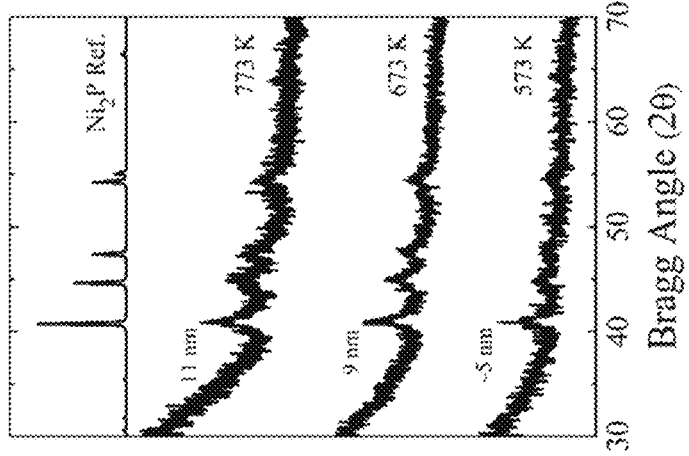
FIG. 2 shows X-ray diffraction patterns for embodiments of 15 wt % $Ni_2P/SiO_2$ catalysts prepared from hypophosphite-based precursors.

For sufficiently high loadings, $Ni_2P$ was identified on the support material using X-ray diffraction (XRD). XRD patterns for $Ni_2P$ on silica ($SiO_2$), alumina ($Al_2O_3$) and amorphous silica-alumina (ASA) are shown in FIGS. 2, 3A, and 3B. Characteristic peaks for $Ni_2P$ were identified by comparing the XRD patterns for the prepared catalysts with a reference pattern for $Ni_2P$ from the powder diffraction file (card no. 089-2742). There was no evidence in the XRD patterns for the formation of impurity phases such as the more metal-rich $Ni_{12}P_5$ (card no. 22-1190). The preparation method could be used for a wide range of metal phosphide loadings. The XRD patterns shown in FIGS. 2, 3A, and 3B are for 15 wt % $Ni_2P/SiO_2$, 25 wt % $Ni_2P/Al_2O_3$, and 25 wt % $Ni_2P/ASA$. Lower $Ni_2P$ loadings on the three oxide supports resulted in $Ni_2P$ particle sizes below the detection limit (<~5 nm) of X-ray diffraction. As used herein, $Ni_2P/SiO_2$ refers to $Ni_2P$ on a silica support, $Ni_2P/Al_2O_3$ refers to $Ni_2P$ on an alumina support, and $Ni_2P/ASA$ refers to $Ni_2P$ on amorphous silica-alumina support.

Figure 4B:
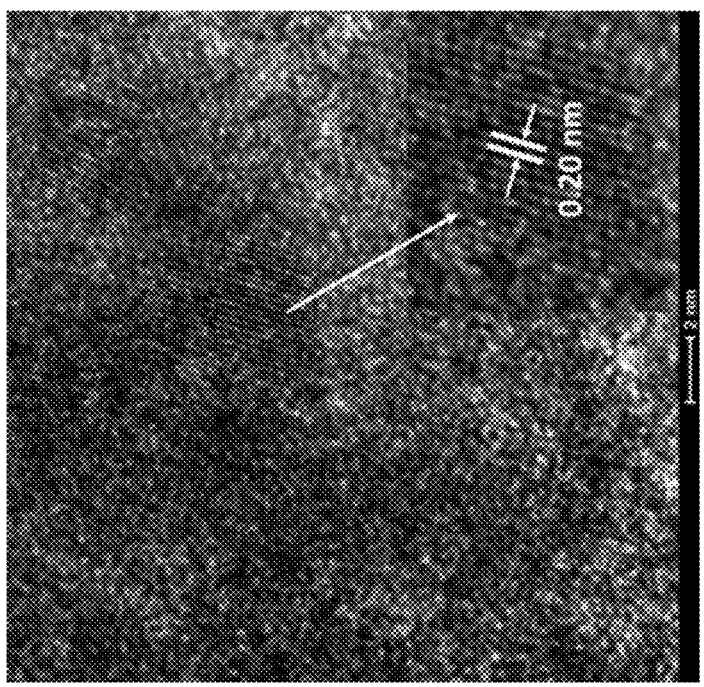
FIG. 4B is a high-resolution transmission electron microscopy image of the 15 wt % $Ni_2P/SiO_2$ catalyst shown in FIG. 4A. The lattice fringe spacing (0.20 nm) indicates the presence of $Ni_2P$ particles on the $SiO_2$ support.
Figure 4A:
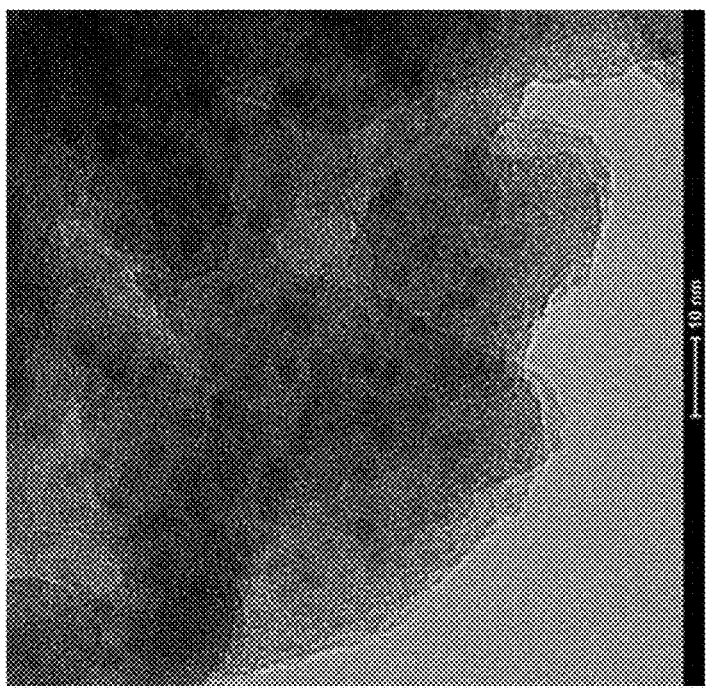
FIG. 4A is a medium-resolution transmission electron microscopy image of an embodiment of a 15 wt % $Ni_2P/SiO_2$ catalyst prepared from a hypophosphite-based precursor. The average $Ni_2P$ particle size was determined to be 3.2±0.4 nm.
Figure 5B:
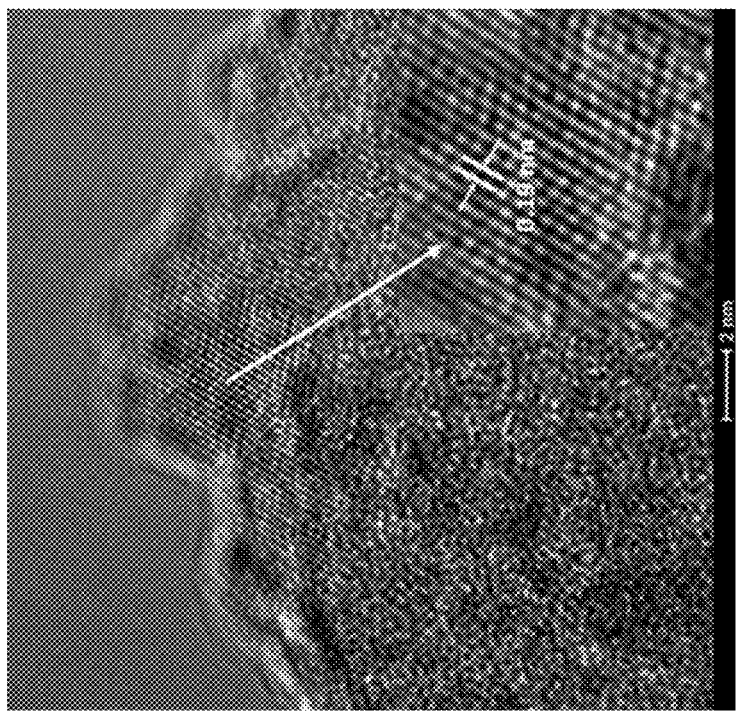
FIG. 5B is a high-resolution transmission electron microscopy image of the 25 wt % $Ni_2P/Al_2O_3$ catalyst shown in FIG. 5A. The lattice fringe spacing (0.19 nm) indicates the presence of $Ni_2P$ particles on the $Al_2O_3$ support.
Figure 5A:
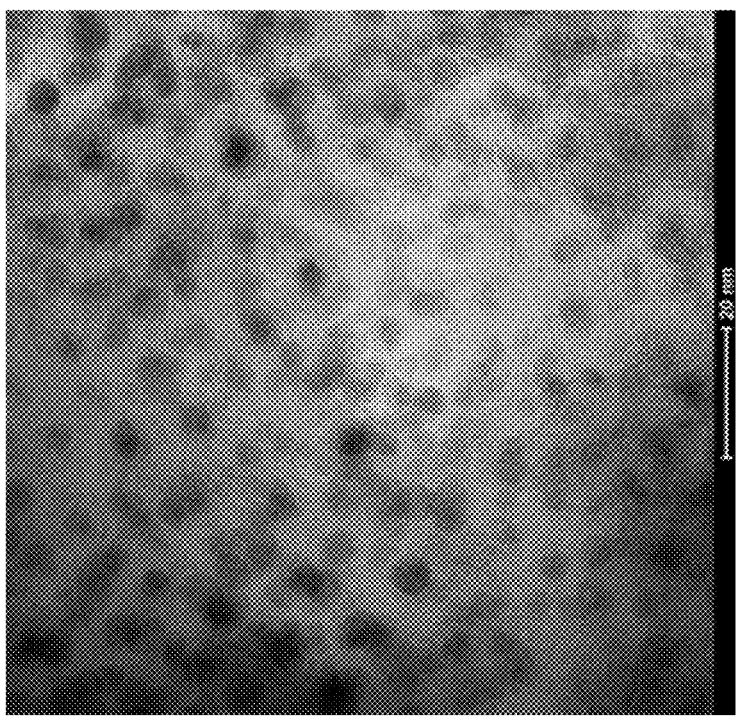
FIG. 5A is a medium-resolution transmission electron microscopy image of an embodiment of a 25 wt % $Ni_2P/Al_2O_3$ catalyst prepared from a hypophosphite-based precursor. The average $Ni_2P$ particle size was determined to be 3.9±0.6 nm.
Figure 6B:
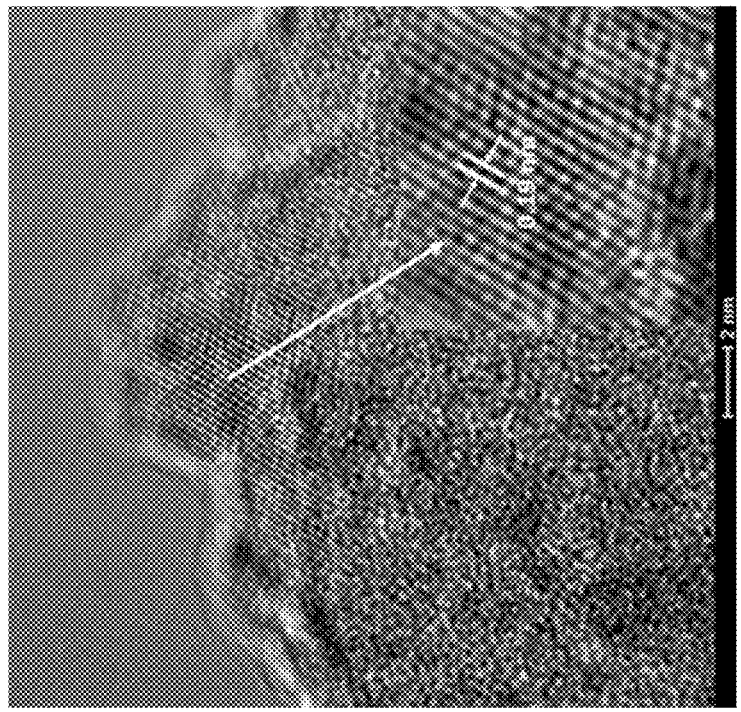
FIG. 6B is a high-resolution transmission electron microscopy image of the 25 wt % $Ni_2P$/ASA catalyst shown in FIG. 6A. The lattice fringe spacing (0.19 nm) indicates the presence of $Ni_2P$ particles on the ASA support.
Figure 6A:
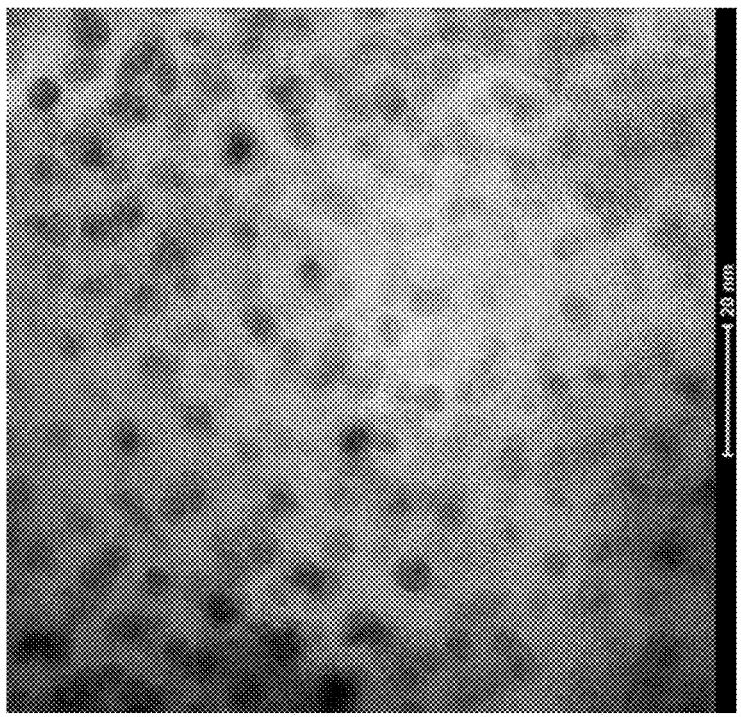
FIG. 6A is a medium-resolution transmission electron microscopy image of a 25 wt % $Ni_2P$/ASA catalyst prepared from a hypophosphite-based precursor. The average $Ni_2P$ particle size was determined to be 3.3±0.5 nm.

FIGS. 4A and 4B are medium- and high-resolution transmission electron microscopy images, respectively, of the 15 wt % $Ni_2P/SiO_2$ catalyst prepared from a hypophosphite-based precursor. The average $Ni_2P$ particle size was determined to be 3.2±0.4 nm. The lattice fringe spacing (0.20 nm) indicated the presence of $Ni_2P$ particles on the $SiO_2$ support. Referring to FIGS. 5A and 5B, the medium- and high-resolution transmission electron microscopy images of the 25 wt % $Ni_2P/Al_2O_3$ catalyst prepared from a hypophosphite-based precursor showed an average $Ni_2P$ particle size of 3.9±0.6 nm. The lattice fringe spacing (0.19 nm) indicated the presence of $Ni_2P$ particles on the $Al_2O_3$ support. Referring to FIGS. 6A and 6B, the medium- and high-resolution transmission electron microscopy images of the 25 wt % $Ni_2P/ASA$ catalyst prepared from a hypophosphite-based precursor showed an average $Ni_2P$ particle size of 3.3±0.5 nm. The lattice fringe spacing (0.19 nm) indicated the presence of $Ni_2P$ particles on the ASA support.

The BET surface areas and chemisorption capacities (CO, $O_2$) for the in situ prepared $Ni_2P$ catalysts are given in Table 1 along with comparison data from ex situ prepared catalysts from phosphate- and hypophosphite-based precursors. The in situ prepared $Ni_2P$ catalysts were reduced within the hydrotreatment reactor. In contrast, the ex situ prepared $Ni_2P$ catalysts were reduced in a reactor separate from the hydrotreatment reactor, then the reduced catalysts were loaded into the hydrotreatment reactor. The in situ prepared catalysts had high surface areas, but there were no clear trends in chemisorption capacities that would predict high catalytic activity.

$Ni_2P$ catalysts supported on $SiO_2$ and $Al_2O_3$, as well as the surface compositions (determined by XPS) for the reduced $Ni_2P/SiO_2$ and $Ni_2P/Al_2O_3$ catalysts is shown below, in Tables 2 and 3.

TABLE 2

Compositions of phosphate- ("phos") and hypophosphite- ("hypo") based $Ni_2P$ catalysts supported on $SiO_2$.

| Catalyst | P/Ni bulk precursor composition | Surface composition |
| --- | --- | --- |
| $Ni_2P/SiO_2$-phos | 0.9 | $Ni_{2.0}P_{0.89}$ |
| $Ni_2P/SiO_2$-hypo | 1.5 | $Ni_{2.0}P_{6.2}$ |

TABLE 3

Compositions for phosphate- ("phos") and hypophosphite- ("hypo") based $Ni_2P$ catalysts supported on $Al_2O_3$.

| Catalyst | P/Ni bulk precursor composition | Surface composition |
| --- | --- | --- |
| $Ni_2P/Al_2O_3$-phos | 1.5 | $Ni_{2.0}P_{8.0}$ |
| $Ni_2P/Al_2O_3$-hypo | 2.0 | $Ni_{2.0}P_{11.0}$ |

Catalyst Activity

Figure 7:
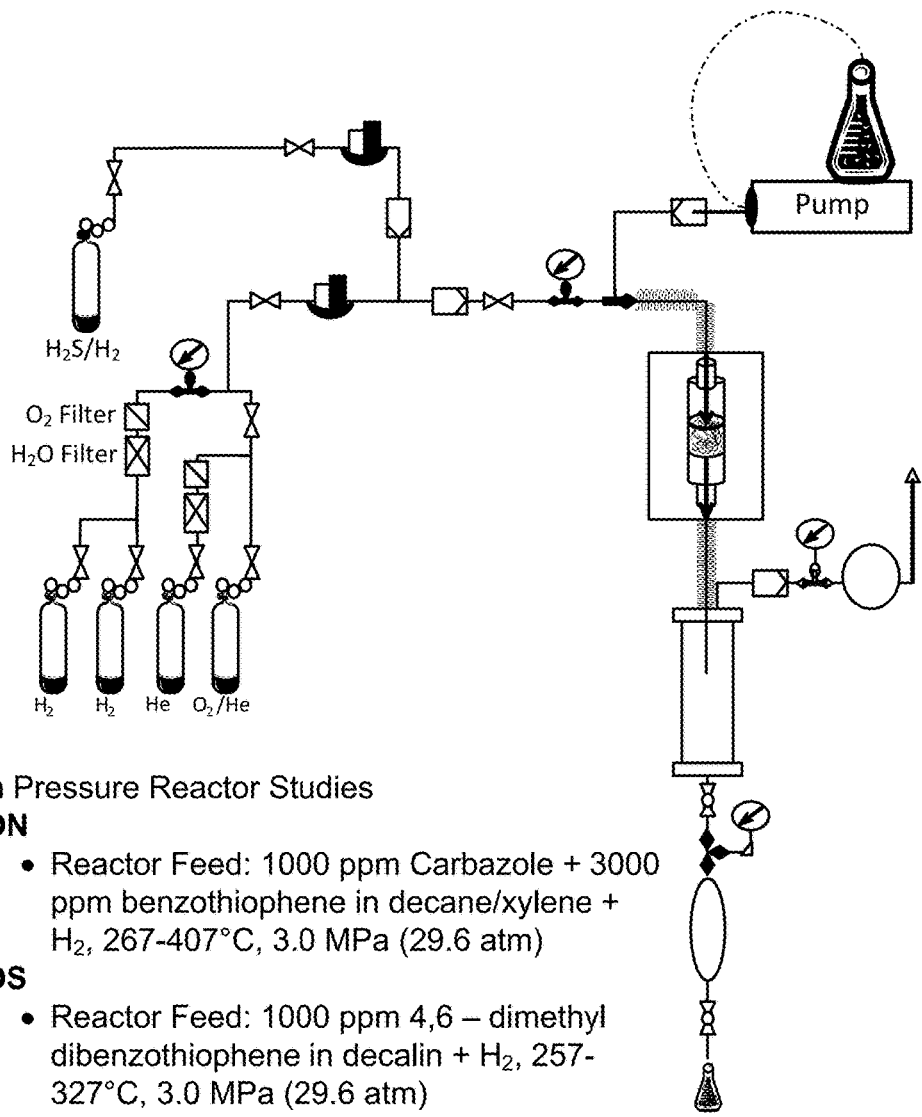
FIG. 7 is a schematic representation of a flow reactor system and test conditions for HDN and HDS evaluations of embodiments of phosphate-based and hypophosphite-based $Ni_2P$ catalysts.

A schematic representation of the high pressure reactor studies of Example 1 is shown in FIG. 7.

Referring to FIG. 7, hydrotreating catalytic activity measurements (hydrodenitrogenation—HDN, hydrodesulfurization—HDS) were carried out using a fixed-bed, continuous flow reactor. Approximately 0.15-0.25 g of catalyst (16-20 mesh size) was diluted with quartz sand to a total volume of 5 mL and loaded into a reactor tube having a diameter of 1.1 cm and length of 40 cm. The HDN measurements were conducted using a mixed feed consisting of 1000 ppm carbazole and 3000 ppm benzothiophene in a 60 wt % decane/39.55 wt % p-xylene solvent mixture. The reactor feed also contained 500 ppm undecane as an internal gas

TABLE 1

Surface Characterization Data for $Ni_2P$ Catalysts.

| | Catalyst | Precursor P/Ni Ratio | EDX Particle composition | Average $Ni_2P$ Crystallite Size (nm) | Average $Ni_2P$ Particle size (nm) | BET Surface Area (m²/g) | CO Chemisorption Capacity (μmol/g) |
| --- | --- | --- | --- | --- | --- | --- | --- |
| Hypophosphite In situ | $Ni_2P/SiO_2$ | 1.5 | — | — | — | 199 | 43 |
| | $Ni_2P/Al_2O_3$ | 2.0 | — | — | — | 159 | 57 |
| | $Ni_2P/ASA$ | 2.0 | — | — | — | 132 | 81 |
| Hypophosphite Ex situ | $Ni_2P/SiO_2$ | 1.5 | $Ni_{2.11}P_{1.00}$ | 9 | 3.2 ± 0.4 | 202 | 51 |
| | $Ni_2P/Al_2O_3$ | 2.0 | $Ni_{2.07}P_{1.00}$ | <5 | 3.9 ± 0.6 | 115 | 46 |
| | $Ni_2P/ASA$ | 2.0 | $Ni_{2.16}P_{1.00}$ | <5 | 3.3 ± 0.5 | 120 | 55 |
| Phosphate Ex situ | $Ni_2P/SiO_2$ | 0.9 | — | 12 | — | 132 | 113 |
| | $Ni_2P/Al_2O_3$ | 1.5 | — | 19 | — | 97 | 52 |
| | $Ni_2P/ASA$ | 2.2 | — | 13 | — | 153 | 19 |

For $Ni_2P/SiO_2$, the catalyst prepared ex situ from a phosphate-based precursor had higher chemisorption capacities than the in situ and ex situ catalysts prepared from the hypophosphite-based precursors. The opposite trend was observed for the alumina- and ASA-supported $Ni_2P$ catalysts.

A comparison of the bulk precursor compositions for phosphate- ("phos") and hypophosphite- ("hypo") based chromatography (GC) standard. The reaction conditions were a total pressure of 3.0 MPa, a liquid feed rate of 5.4 mL/min and an $H_2$ feed rate of 50.0 mL/min. The internal reactor temperature was monitored with an axially mounted thermocouple in direct contact with the catalyst bed. The $Ni_2P$ phosphide catalysts or their precursors were pretreated by heating from room temperature to 377-400° C. in 1 h in a 60 mL/min flow of $H_2$ (or 3 mol % $H_2S/H_2$) and held at this temperature for 2 h, then cooled to room temperature in continued $H_2$ flow. After pretreatment, with the catalyst samples at room temperature, the reactor was pressurized to 3.0 MPa with $H_2$. The catalyst bed was heated to 267° C. over 15 min in a 50 mL/min flow of $H_2$ and liquid feed injection was begun once the reactor reached the operating temperature. The reactor was allowed to stabilize under operating conditions for 3 h prior to sampling reactor effluent at 30 min intervals over 2.5 h. The catalyst temperature was raised 25° C., the reactor stabilized for 3 h, followed by sampling of the reactor effluent at 30 min intervals. This procedure was repeated until sampling at the maximum catalyst temperature (407° C.) was completed. The first effluent sample collected at each temperature was discarded; the four subsequent effluent samples were analyzed off-line using a gas chromatograph (Agilent 6890N) equipped with an HP-5 column and a flame ionization detector. HDN product identification was conducted by gas chromatography-mass spectrometry (GC/MS) and the gas chromatography (GC) was calibrated using serial diluted product standard solutions to allow product quantification of reactor effluent samples.

Figure 9B:
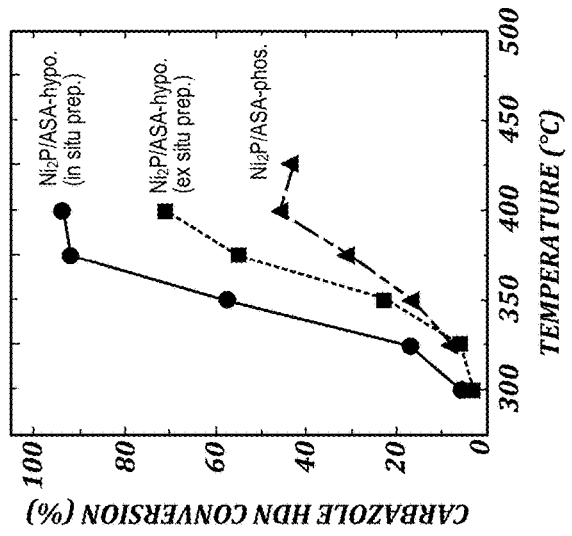
FIG. 9B is a graph showing carbazole HDN conversion vs. temperature for embodiments of 25 wt % $Ni_2P/ASA$ catalysts. The HDN was carried out using a mixed carbazole/benzothiophene feed.
Figure 9A:
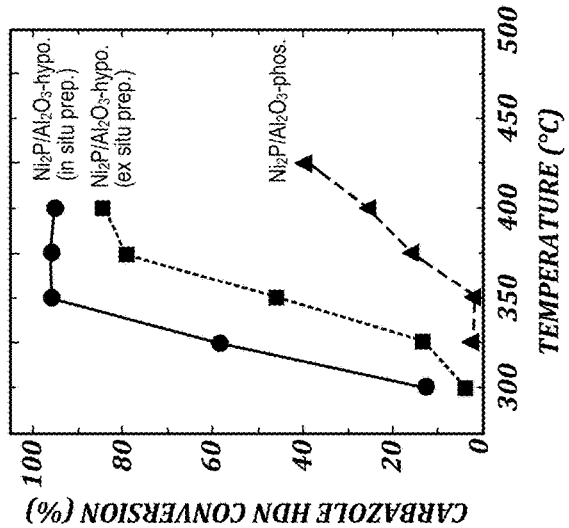
FIG. 9A is a graph showing carbazole HDN conversion vs. temperature for embodiments of 25 wt % $Ni_2P/Al_2O_3$ catalysts. The HDN was carried out using a mixed carbazole/benzothiophene feed.
Figure 8:
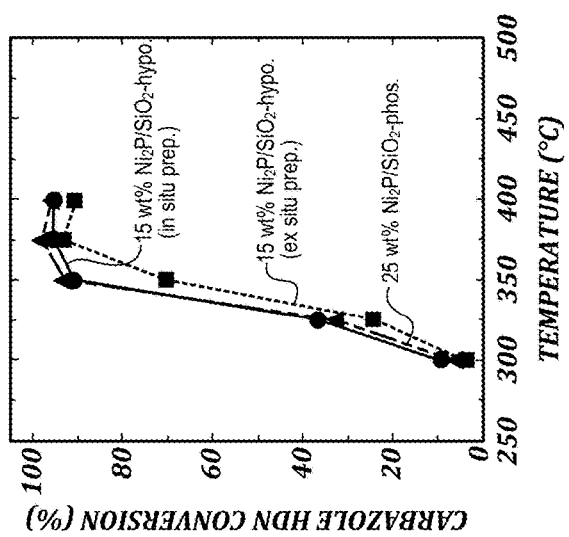
FIG. 8 is a graph showing carbazole HDN conversion vs. temperature for embodiments of $Ni_2P/SiO_2$ catalysts. The HDN was carried out using a mixed carbazole/benzothiophene feed.

The carbazole HDN activities (on a mass catalyst basis) are plotted in FIGS. 8, 9A, and 9B for $Ni_2P$ on the different supports. As used herein, the suffix "-hypo" refers to a $Ni_2P$ catalyst prepared using hypophosphite-based precursors, and the suffix "-phos" refers to a $Ni_2P$ catalyst prepared using phosphate-based precursors. As used herein, "in situ prep" refers to a catalyst that was reduced inside a hydrotreatment reactor, while "ex situ prep" refers to a catalyst that was prepared in a reactor separate from a hydrotreatment reactor. The catalysts precursors reduced in situ had similar or substantially higher activities than the $Ni_2P$ catalysts prepared by conventional ex situ methods. In the case of the $Ni_2P/SiO_2$ catalysts (FIG. 8), the catalyst activities were similar; however, the catalyst prepared ex situ from a phosphate-based precursor (25 wt % $Ni_2P/SiO_2$-phos.) had a significantly higher $Ni_2P$ loading than the hypophosphite-based catalysts (15 wt % $Ni_2P/SiO_2$-hypo.). It is believed that a 15 wt % $Ni_2P/SiO_2$-phos. catalyst would have a lower HDN activity and thus mirror the trends observed for the $Ni_2P/Al_2O_3$, and $Ni_2P/ASA$ catalysts, for which the phosphate- and hypophosphite-based catalysts have the same $Ni_2P$ loadings.

Figure 11:
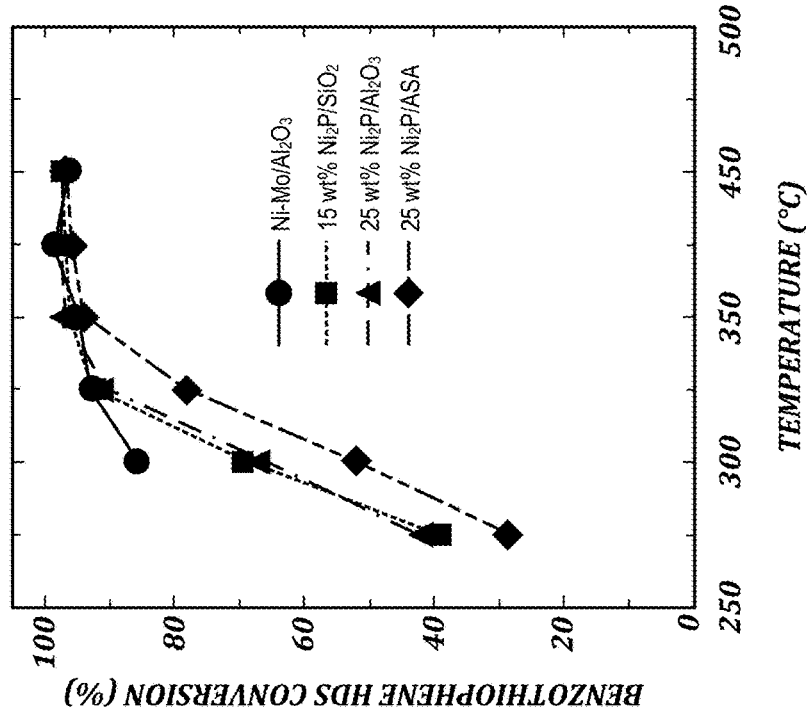
FIG. 11 is a graph showing benzothiophene HDS activities for a sulfided Ni—Mo/$Al_2O_3$ catalyst and embodiments of $Ni_2P$ catalysts prepared by in situ reduction of hypophosphite-based precursors. The HDS was carried out using a mixed carbazole/benzothiophene feed.
Figure 10:
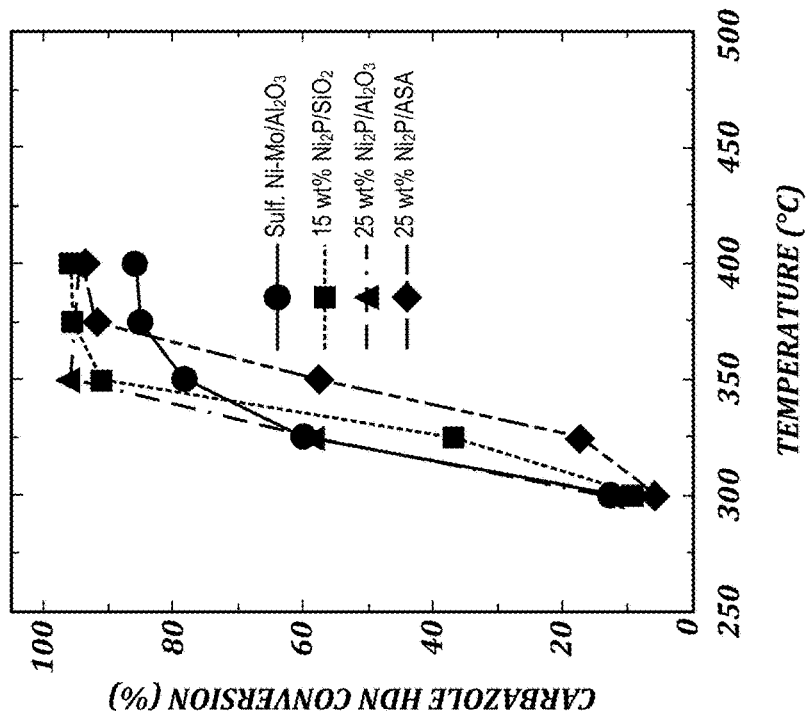
FIG. 10 is a graph showing carbazole HDN activities for a sulfided Ni—Mo/$Al_2O_3$ catalyst and embodiments of $Ni_2P$ catalysts prepared by in situ reduction of hypophosphite-based precursors. The HDN was carried out using a mixed carbazole/benzothiophene feed.

As is clear from the results shown in FIGS. 9A and 9B, in situ prepared $Ni_2P/Al_2O_3$ and $Ni_2P/ASA$ catalysts from hypophosphite-based precursors substantially out-performed the ex situ prepared catalysts from the hypophosphite and phosphate-based precursors. When supported on Al-containing supports such as $Al_2O_3$, ASA or zeolites, $Ni_2P$ catalysts prepared at high temperatures from phosphate-based precursors exhibited inferior catalytic properties compared to $Ni_2P/SiO_2$ catalysts because of the strong interaction and/or reaction of the impregnated phosphorus with the support to form $AlPO_4$. Hypophosphite-based methods have been described for the synthesis of $Ni_2P/Al_2O_3$ catalysts, but these ex situ methods require washing steps to remove inorganic salts (e.g., NaCl) because of the metal and hypophosphite salts utilized. In addition, this Example shows that in situ prepared $Ni_2P/Al_2O_3$ and $Ni_2P/ASA$ catalysts were substantially more active than their ex situ prepared counterparts. As shown in FIG. 10, the $Ni_2P/SiO_2$, $Ni_2P/Al_2O_3$ and $Ni_2P/ASA$ catalysts prepared by in situ reduction of hypophosphite-based precursors ($H_2$, 400° C.) were significantly more active for carbazole HDN than a commercial Ni—Mo/$Al_2O_3$ catalyst (Shell 424, having 4 wt % NiO, 19.5 wt % $MoO_3$, and 8 wt % $P_2O_5$) at temperatures for which the conversion is high (350-407° C.). The $Ni_2P$ catalysts prepared in situ from hypophosphite-based precursors also exhibited high activity for the HDS of benzothiophene during experiments with the mixed carbazole/benzothiophene feed (FIG. 11). At temperatures in the range 325-407° C., the benzothiophene HDN conversions were similar to those of the commercial Ni—Mo/$Al_2O_3$ catalyst (Shell 424 catalyst).

Figure 12A:
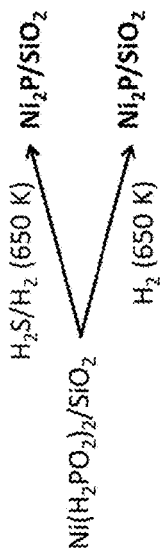
FIG. 12A is a schematic diagram of the conditions used for in situ preparation of $Ni_2P/SiO_2$ catalysts from hypophosphite-based precursors.
Figure 12C:
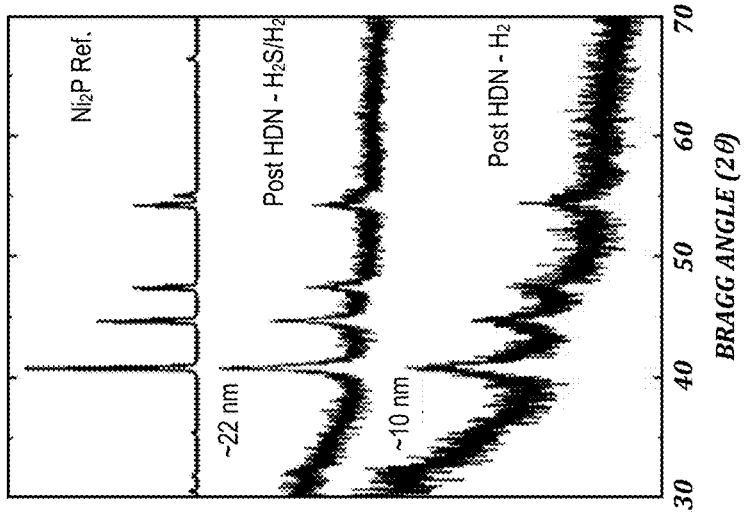
FIG. 12C shows X-ray diffraction patterns for embodiments of 15 wt % $Ni_2P/SiO_2$ catalysts after catalytic testing in the mixed carbazole/benzothiophene feed.
Figure 12B:
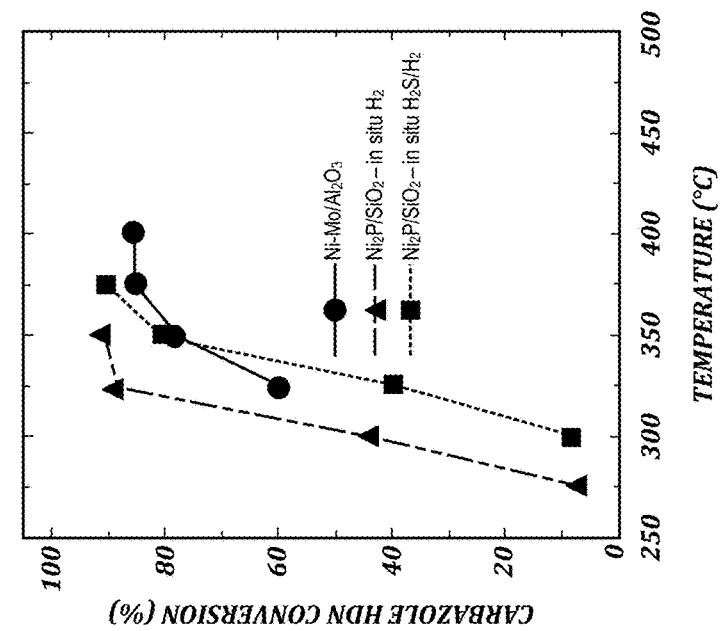
FIG. 12 B is a graph showing carbazole HDN activities for a sulfided Ni—Mo/$Al_2O_3$ catalyst and embodiments of 15 wt % $Ni_2P/SiO_2$ catalysts prepared by in situ reduction of hypophosphite-based precursors in $H_2$ or $H_2S/H_2$. The HDN was carried out using a mixed carbazole/benzothiophene feed.

An additional feature of the catalyst of Example 1 is that the catalyst precursors could be reduced in situ using a sulfidation pretreatment (3 mol % $H_2S/H_2$) to give highly active $Ni_2P$ catalysts, as shown in FIG. 12A. The carbazole HDN activities of 15 wt % $Ni_2P/SiO_2$ prepared by in situ reduction of hypophosphite-based precursors in $H_2$ or $H_2S/H_2$ at 377° C. are shown in FIG. 12B. The $Ni_2P/SiO_2$ catalyst prepared using $H_2S/H_2$ was less active than the catalyst prepared in $H_2$, but exhibited higher activity than the commercial Ni—Mo/$Al_2O_3$ catalyst (Shell 424) at 350° C. and higher. X-ray diffraction patterns (FIG. 12C) of the $Ni_2P/SiO_2$ catalysts after the catalytic testing in the mixed carbazole/benzothiophene feed confirmed that the hypophosphite-based precursors were converted to phase pure $Ni_2P$ during the in situ reductions in $H_2$ or $H_2S/H_2$ at 377° C.

Figures 13A, 13B:
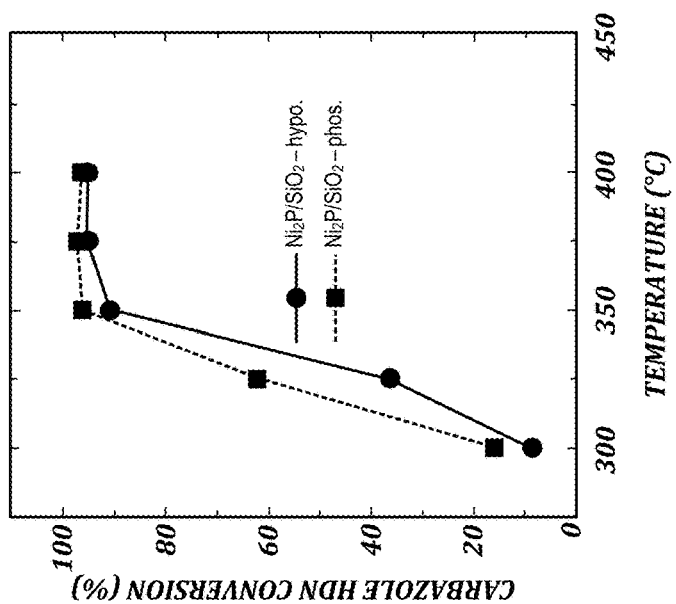
FIG. 13A is a graph showing carbazole HDN activities for $Ni_2P/SiO_2$ catalysts prepared from phosphate- and hypophosphite-based precursors. The HDN activity was tested using a mixed carbazole/benzothiophene feed.
FIG. 13B is a table listing properties of the $Ni_2P/SiO_2$ catalysts prepared from phosphate- and hypophosphite-based precursors of FIG. 13A.
Figures 14A, 14B:
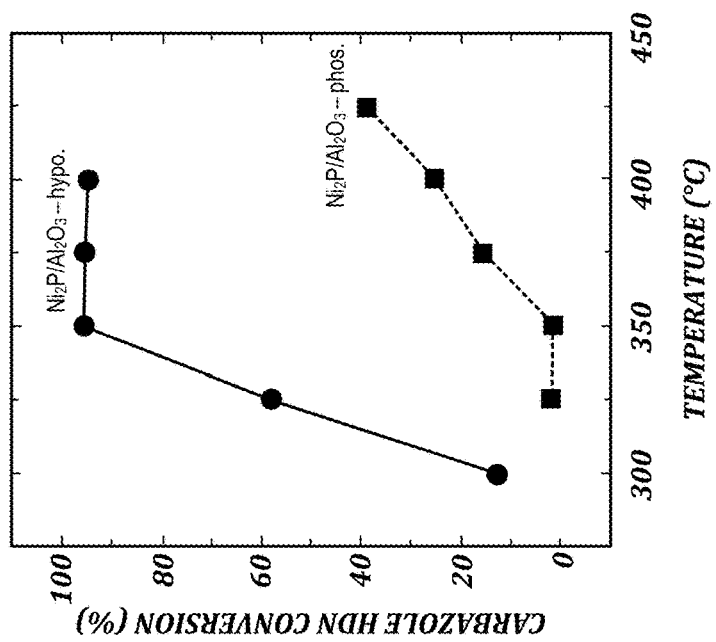
FIG. 14A is a graph showing carbazole HDN activities for $Ni_2P/Al_2O_3$ catalysts prepared from phosphate- and hypophosphite-based precursors. The HDN activity was tested using a mixed carbazole/benzothiophene feed.
FIG. 14B is a table listing properties of the $Ni_2P/Al_2O_3$ catalysts prepared from phosphate- and hypophosphite-based precursors of FIG. 14A.

FIG. 13A compares the carbazole HDN activities for $Ni_2P/SiO_2$ catalysts prepared from phosphate- and hypophosphite-based precursors. The HDN activity testing was conducted using a mixed carbazole/benzothiophene feed. The physical characteristics the $Ni_2P/SiO_2$ catalysts of FIG. 13A are shown in FIG. 13B. The hypophosphite-based $Ni_2P/SiO_2$ catalyst had smaller particles, but a lower CO chemisorption capacity than the phosphate-based $Ni_2P/SiO_2$ catalyst. The high HDN activity of hypophosphite-based $Ni_2P/SiO_2$ catalyst prepared in situ was associated with a high HDN turnover frequency FIG. 14A compares the carbazole HDN activities for $Ni_2P/Al_2O_3$ catalysts prepared from phosphate- and hypophosphite-based precursors. The HDN activity testing was conducted using a mixed carbazole/benzothiophene feed. The physical characteristics the $Ni_2P/Al_2O_3$ catalysts of FIG. 14A are shown in FIG. 14B. The hypophosphite-based $Ni_2P/Al_2O_3$ catalyst had smaller particles, but a similar CO chemisorption capacity to the phosphate-based $Ni_2P/Al_2O_3$ catalyst. The high HDN activity of hypophosphite-based $Ni_2P/Al_2O_3$ catalyst prepared in situ was associated with a high HDN turnover frequency.

Figures 15A, 15B:
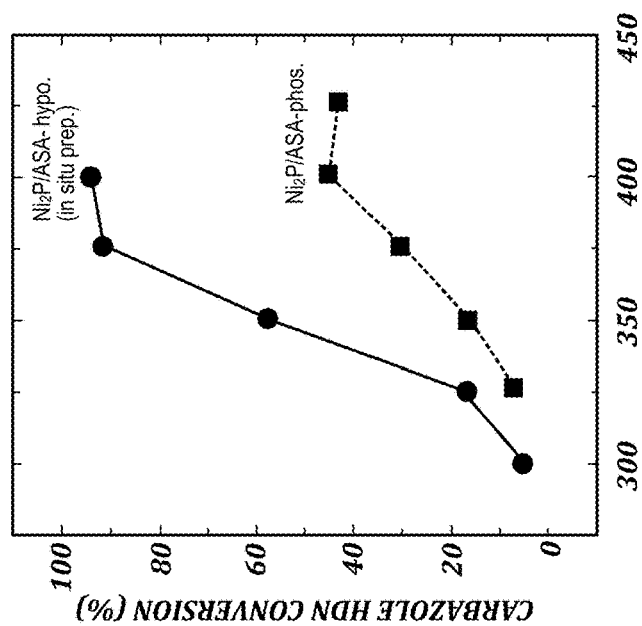
FIG. 15A is a graph showing carbazole HDN activities for $Ni_2P/ASA$ catalysts prepared from phosphate- and hypophosphite-based precursors. The HDN activity was tested using a mixed carbazole/benzothiophene feed.
FIG. 15B a table listing properties of the $Ni_2P/ASA$ catalysts prepared from phosphate- and hypophosphite-based precursors of FIG. 15A.

FIG. 15A compares the carbazole HDN activities for $Ni_2P/ASA$ catalysts prepared from phosphate- and hypophosphite-based precursors. The HDN activity testing was conducted using a mixed carbazole/benzothiophene feed. The physical characteristics the $Ni_2P/ASA$ catalysts of FIG. 15A are shown in FIG. 15B. The hypophosphite-based $Ni_2P/ASA$ catalyst had smaller particles and a higher CO chemisorption capacity than the phosphate-based $Ni_2P/ASA$ catalyst. The high HDN activity of hypophosphite-based $Ni_2P/ASA$ catalyst prepared in situ is associated with a high active site density.

Figure 16:
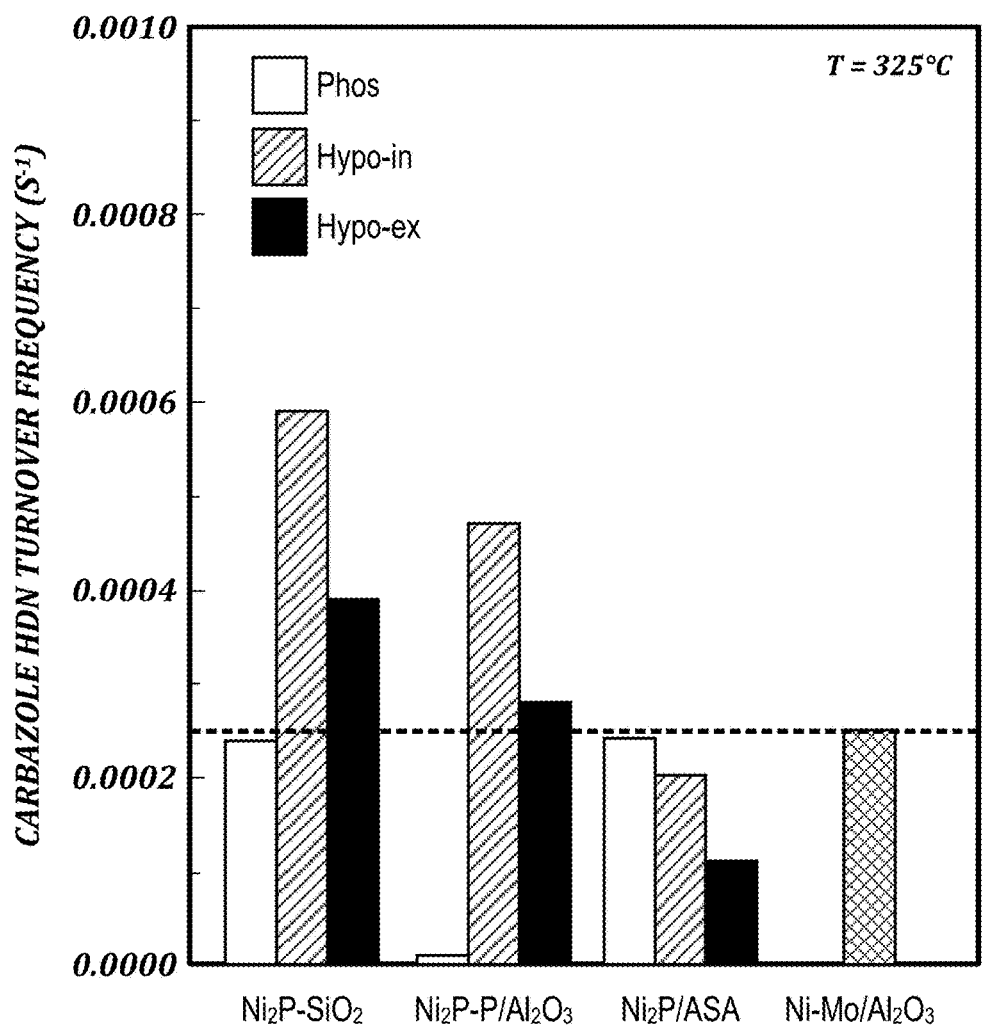
FIG. 16 is a graph showing carbazole HDN turnover frequencies (T=325° C.) of $Ni_2P$ on $SiO_2$, $Al_2O_3$ and ASA supports for catalysts prepared in situ and ex situ using hypophosphite-based precursors, as well as from phosphate-based precursors. The turnover frequencies were determined using CO chemisorption capacities. Also shown is the carbazole HDN turnover frequency for a sulfided Ni—Mo/$Al_2O_3$ catalyst (4 wt % NiO, 19.5 wt % $MoO_3$, 8 wt % $P_2O_5$), for which the low temperature $O_2$ chemisorption capacity was used to calculate the turnover frequency.

FIG. 16 compares the carbazole HDN turnover frequencies (T=325° C.) of $Ni_2P$ on $SiO_2$, $Al_2O_3$ and ASA supports for catalysts prepared in situ and ex situ using hypophosphite-based precursors, as well as using phosphate-based precursors. The turnover frequencies were determined using CO chemisorption capacities. Also shown is the HDN turnover frequency for a sulfided Ni—Mo/$Al_2O_3$ catalyst (4 wt % NiO, 19.5 wt % $MoO_3$, 8 wt % $P_2O_5$), for which the low temperature $O_2$ chemisorption capacity was used to calculate the turnover frequency. The $Ni_2P/Al_2O_3$ and $Ni_2P/SiO_2$ catalysts prepared from hypophosphite-based precursors had higher HDN turnover frequencies than the sulfided Ni—Mo/$Al_2O_3$ catalyst, particularly the in situ prepared catalysts.

Example 1 demonstrates the preparation of metal phosphides (e.g., $Ni_2P$) supported on high surface area metal oxides (silica, alumina, amorphous silica-alumina) in a manner that is compatible with conditions employed in commercial hydrotreating units. Hypophosphite-based precursors could be reduced in situ in a reactor using either $H_2$ or $H_2S/H_2$ at 300-500° C. to give highly active $Ni_2P$ catalysts as demonstrated by HDN and HDS activity measurements using a mixed carbazole/benzothiophene feed.

Example 2

$Ni_2P$ on $P_2O_5$- or $B_2O_3$-modified Supports

This example describes a method for preparing metal phosphides (e.g., $Ni_2P$) supported on high surface area $P_2O_5$- or $B_2O_3$-modified $Al_2O_3$ supports (P—$Al_2O_3$ and B—$Al_2O_3$, respectively) in a manner that is compatible with conditions employed in commercial hydrotreating units. The catalyst synthesis includes impregnation, drying and calcination of the P- or B-impregnated $Al_2O_3$ supports, followed by impregnation, drying and in situ reduction (i.e., reduction within the hydrotreatment reactor) of the $Ni_2P$ catalyst precursor to yield highly active catalysts for the removal of S and N impurities from crude oil fractions.

An aqueous solution of $H_3BO_3$, $H_3PO_4$, and/or an ammonium phosphate salt such as $NH_4H_2PO_4$ and/or $(NH_4)_2HPO_4$, was impregnated onto the $Al_2O_3$ support until incipient wetness. The resulting P—$Al_2O_3$ and B—$Al_2O_3$ supports had loadings of 0-5 wt % P and 0-2 wt % B, respectively. A metal hydroxide, such as nickel hydroxide ($Ni(OH)_2$), was dissolved in hypophosphorous acid ($H_3PO_2$, 50 wt % aqueous solution). $Ni(NO_3)_2$ or another Ni salt may or may not be added to the impregnation solution to adjust the P/Ni mole ratio. The resulting solution had a phosphorus-to-nickel mole ratio (P/Ni) of 1.5-2.0, the solution was maintained at an elevated temperature 70° C.) to avoid precipitation of solid material. The solution was impregnated onto the P—$Al_2O_3$ or B—$Al_2O_3$ support and dried at 70° C. The dried catalyst precursor was loaded into the reactor system, purged at room temperature in an inert gas, and then heated in flowing hydrogen ($H_2$) or hydrogen sulfide/hydrogen ($H_2S/H_2$) to a temperature in the range 300-500° C. During the heating step, the nickel hypophosphite on the oxide support was converted to phase-pure $Ni_2P$.

Referring to FIG. 17A, a schematic representation of the preparation steps for P- (or B-) modified $Ni_2P/Al_2O_3$ catalysts is provided. FIG. 17B shows X-ray diffraction patterns for hypophosphite-based $Ni_2P/P$—$Al_2O_3$ catalysts having different P-loadings on an $Al_2O_3$ support (0-5 wt % P). FIG. 17C shows X-ray diffraction patterns for phosphate-based $Ni_2P/P$—$Al_2O_3$ catalysts having different P-loadings on an $Al_2O_3$ support (0-5 wt % P).

Figures 18A, 18B:
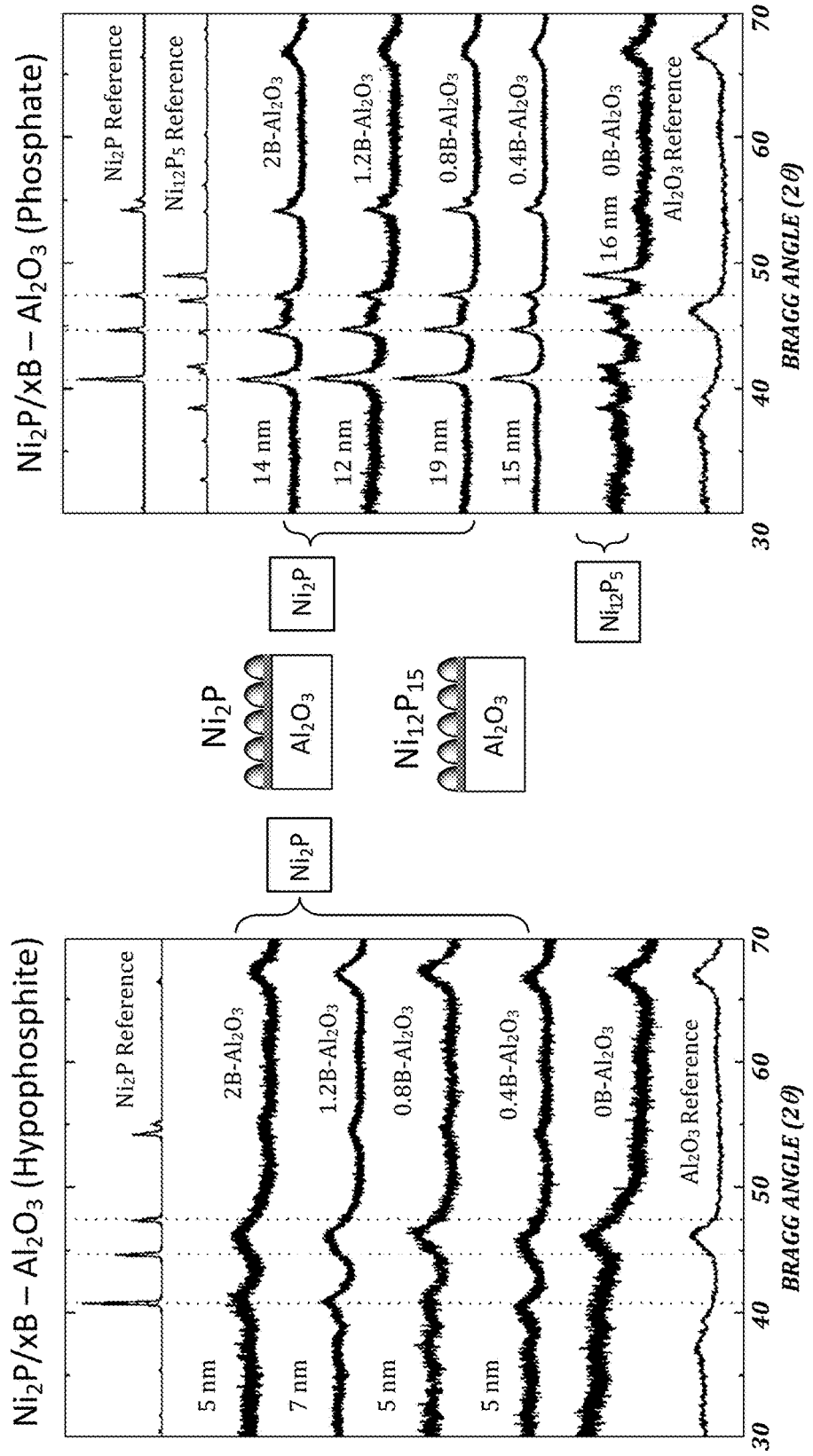
FIG. 18A shows X-ray diffraction patterns for hypophosphite-based $Ni_2P/B$—$Al_2O_3$ catalysts having different B-loadings on the $Al_2O_3$ support (0-2 wt % B).
FIG. 18B shows XRD patterns for phosphate-based $Ni_2P/B$—$Al_2O_3$ catalysts having different B-loadings on the $Al_2O_3$ support (0-2 wt % B).

FIG. 18A shows XRD patterns for hypophosphite-based $Ni_2P/B$—$Al_2O_3$ catalysts having different B-loadings on the $Al_2O_3$ support (0-2 wt % B). The hypophosphite-based $Ni_2P/P$—$Al_2O_3$ catalysts (P/Ni=1.5) showed XRD evidence of the presence of $Ni_2P$ for all P-loadings, while the phosphate-based $Ni_2P/P$—$Al_2O_3$ catalysts (P/Ni=1.5) only showed evidence of $Ni_2P$ for catalysts with P-loadings≥2.0 wt % P. FIG. 18B shows XRD patterns for phosphate-based $Ni_2P/B$—$Al_2O_3$ catalysts having different B-loadings on the $Al_2O_3$ support (0-2 wt % B). The hypophosphite-based $Ni_2P/B$—$Al_2O_3$ catalysts (P/Ni=1.5) showed XRD evidence of the presence of $Ni_2P$ for all B-loadings, while the phosphate-based $Ni_2P/B$—$Al_2O_3$ catalysts (P/Ni=1.5) only showed evidence of $Ni_2P$ for catalysts with B-loadings 0.4 wt % B.

Figure 19B:
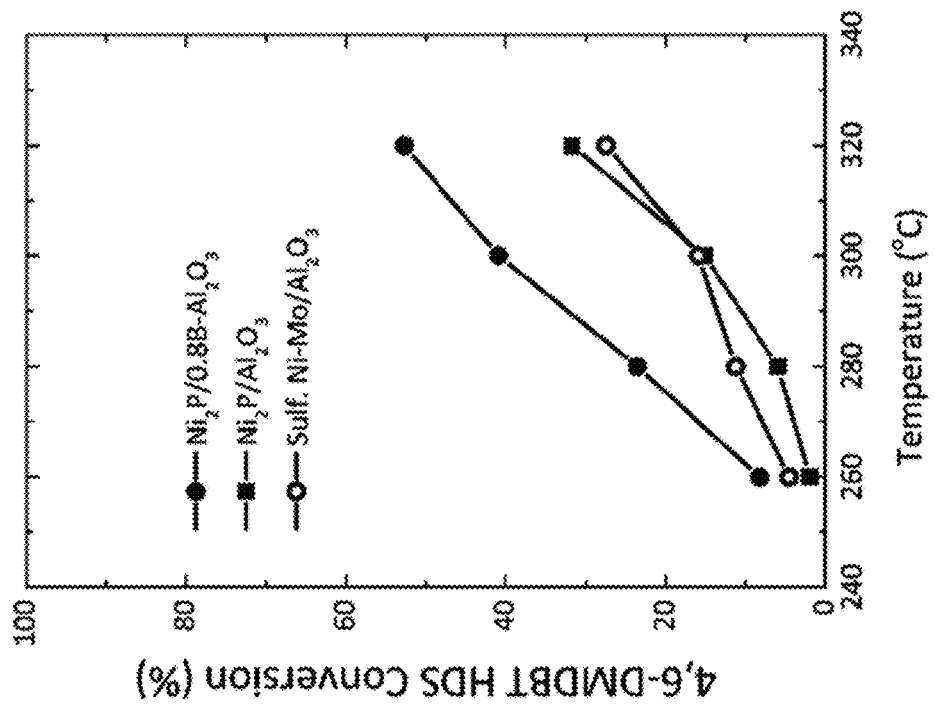
FIG. 19B is a graph showing the 4,6-dimethyldibenzothiophene HDS activities vs. temperature for $Ni_2P/Al_2O_3$ and $Ni_2P/0.8B$—$Al_2O_3$ catalysts prepared from hypophosphite-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin.
Figure 19A:
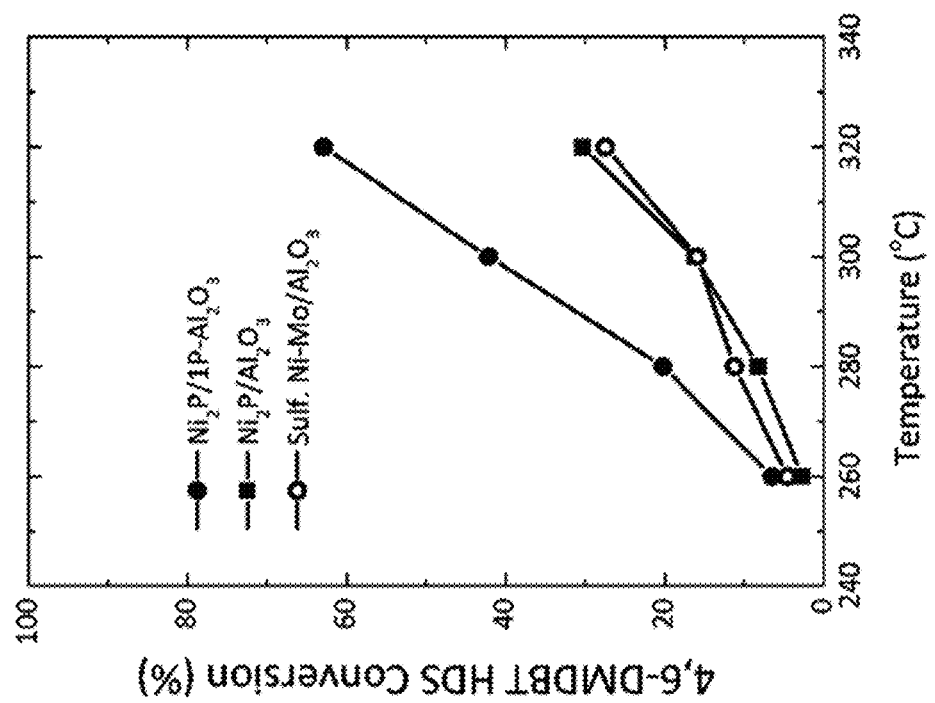
FIG. 19A is a graph showing the 4,6-dimethyldibenzothiophene HDS activities vs. temperature for $Ni_2P/Al_2O_3$ and $Ni_2P/1P$—$Al_2O_3$ catalysts prepared from hypophosphite-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin.

FIG. 19A is a graph showing the 4,6-dimethyldibenzothiophene HDS activities vs. temperature for $Ni_2P/Al_2O_3$ $Ni_2P/1P$—$Al_2O_3$ catalysts prepared from hypophosphite-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin. The $Ni_2P/1P$—$Al_2O_3$ catalyst had a higher HDS activity than the $Ni_2P/Al_2O_3$ and sulfided Ni—Mo/$Al_2O_3$ catalysts over the indicated temperature range.

FIG. 19B is a graph showing the 4,6-dimethyldibenzothiophene HDS activities vs. temperature for $Ni_2P/Al_2O_3$ and $Ni_2P/B$—$Al_2O_3$ catalysts prepared from hypophosphite-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin. The $Ni_2P/0.8B$—$Al_2O_3$ catalyst had a higher HDS activity than the $Ni_2P/Al_2O_3$ and sulfided Ni—Mo/$Al_2O_3$ catalysts over the indicated temperature range.

Figure 20B:
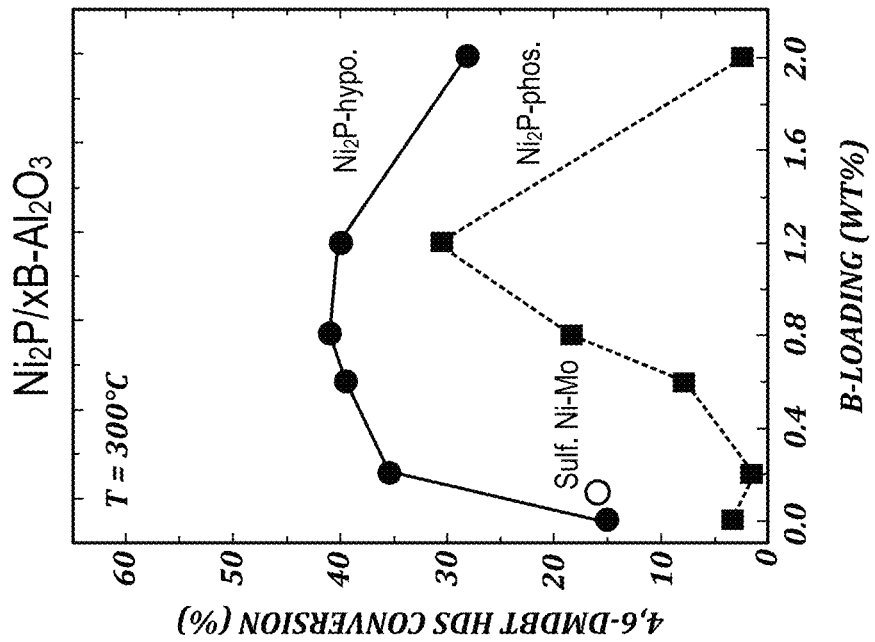
FIG. 20B is a graph showing the 4,6-dimethyldibenzothiophene HDS activities (T=300° C.) for $Ni_2P/xB$—$Al_2O_3$ catalysts (0≤x≤2 wt % B) prepared from hypophosphite- and phosphate-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin.
Figure 20A:
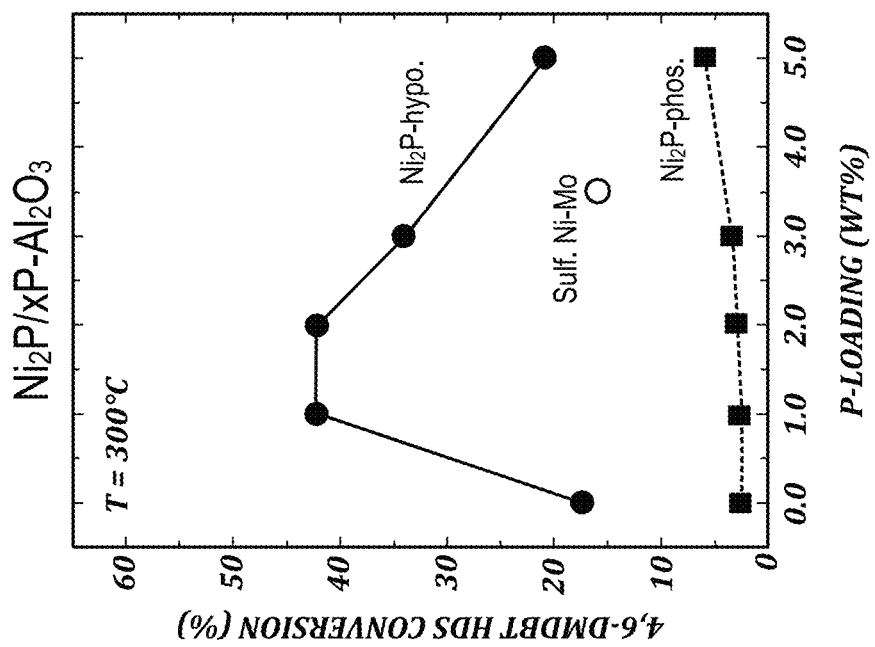
FIG. 20A is a graph showing the 4,6-dimethyldibenzothiophene HDS activities (T=300° C.) for $Ni_2P/xP$—$Al_2O_3$ catalysts (0≤x≤5 wt % P) prepared from hypophosphite- and phosphate-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin.

FIG. 20A is a graph showing the 4,6-dimethyldibenzothiophene HDS activities for $Ni_2P/P$—$Al_2O_3$ catalysts (T=300° C.) prepared from hypophosphite- and phosphate-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin. The hypophosphite-based $Ni_2P/P$—$Al_2O_3$ catalysts having 1-3 wt % P loadings of the $Al_2O_3$ support had superior HDS activities compared to the sulfided Ni—Mo/$Al_2O_3$ catalyst at 300° C.

FIG. 20B is a graph showing the 4,6-dimethyldibenzothiophene HDS activities for $Ni_2P/B$—$Al_2O_3$ catalyst (T=300° C.) prepared from hypophosphite- and phosphate-based precursors. Also shown is the 4,6-dimethyldibenzothiophene HDS activity for a sulfided Ni—Mo/$Al_2O_3$ catalyst. The reactor feed consisted of 1000 PPM 4,6-dimethyldibenzothiophene in decalin. The hypophosphite-based $Ni_2P/B$—$Al_2O_3$ catalysts having 0.2-2.0 wt % B loadings of the $Al_2O_3$ support had superior HDS activities compared to the sulfided Ni—Mo/$Al_2O_3$ catalyst at 300° C.

While illustrative embodiments have been illustrated and described, it will be appreciated that various changes can be made therein without departing from the spirit and scope of the invention.

The invention claimed is:

1. A method of preparing a hydrotreatment catalyst comprising nanoscale $Ni_2P$ particles on a support, the method comprising the steps of:
   (a) providing an impregnation solution comprising nickel hydroxide in hypophosphorous acid;
   (b) impregnating the support with the impregnation solution;
   (c) drying the impregnation solution to provide $Ni(H_2PO_2)_2$ on the support; and
   (d) reducing the $Ni(H_2PO_2)_2$ on the support in a hydrogen environment, a sulfiding environment or an inert gas environment and at a temperature of 300-500° C. to provide a hydrotreatment catalyst comprising nanoscale $Ni_2P$ particles on the support.

2. The method of claim 1, wherein the impregnation solution has a mole ratio of P/Ni of about 2.0.

3. The method of claim 1, wherein drying the impregnated support comprises heating to a maximum temperature of 75° C.

4. The method of claim 1, further comprising depositing a surface layer of $P_2O_5$, $B_2O_3$, or both, on the support prior to step (a).

5. The method of claim 1, wherein the support is selected from the group consisting of silica, alumina, and amorphous silica-alumina; optionally comprising a surface layer comprising $P_2O_5$, $B_2O_3$, or a combination thereof.

6. The method of claim 1, wherein the impregnation solution has a mole ratio of a mole ratio of P/Ni of 1.0 to 2.0.

7. The method of claim 1, wherein the impregnation solution has a mole ratio of P/Ni greater than 2.

* * * * *

UNITED STATES PATENT AND TRADEMARK OFFICE
CERTIFICATE OF CORRECTION

PATENT NO. : 10,406,509 B2  
APPLICATION NO. : 15/306468  
DATED : September 10, 2019  
INVENTOR(S) : Bussell Page 1 of 1

It is certified that error appears in the above-identified patent and that said Letters Patent is hereby corrected as shown below:

In the Claims

| Column | Line | ERROR |
|---|---|---|
| 17 (Claim 6) | 12 | "a mole ratio of a mole ratio of" should read --a mole ratio of-- |

Signed and Sealed this  
Twenty-fifth Day of February, 2020

Andrei Iancu  
*Director of the United States Patent and Trademark Office*